US012136317B2

(12) United States Patent
Haishima et al.

(10) Patent No.: US 12,136,317 B2
(45) Date of Patent: Nov. 5, 2024

(54) INFORMATION MANAGEMENT SYSTEM AND TERMINAL DEVICE

(71) Applicant: Universal Entertainment Corporation, Tokyo (JP)

(72) Inventors: Jun Haishima, Tokyo (JP); Shigehiko Kitagawa, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 312 days.

(21) Appl. No.: 17/603,044

(22) PCT Filed: Mar. 19, 2020

(86) PCT No.: PCT/JP2020/012400
§ 371 (c)(1),
(2) Date: Oct. 12, 2021

(87) PCT Pub. No.: WO2020/213343
PCT Pub. Date: Oct. 22, 2020

(65) Prior Publication Data

US 2022/0189252 A1 Jun. 16, 2022

(30) Foreign Application Priority Data

Apr. 19, 2019 (JP) ................................ 2019-080144

(51) Int. Cl.
*G07F 17/32* (2006.01)
*G06Q 50/34* (2012.01)

(52) U.S. Cl.
CPC ...... *G07F 17/3255* (2013.01); *G07F 17/3209* (2013.01); *G07F 17/3211* (2013.01); *G07F 17/3223* (2013.01); *G07F 17/3232* (2013.01); *G06Q 50/34* (2013.01); *G07F 17/3288* (2013.01)

(58) Field of Classification Search
CPC ......................... G07F 17/3255; G07F 17/3288
See application file for complete search history.

(56) References Cited

U.S. PATENT DOCUMENTS

| | | | | |
|---|---|---|---|---|
| 2016/0071373 | A1 | 3/2016 | Anderson et al. | |
| 2018/0096561 | A1 | 4/2018 | Gagner et al. | |
| 2018/0330383 | A1* | 11/2018 | Pontious | G06Q 20/3221 |
| 2019/0096177 | A1* | 3/2019 | Sepich | G07F 17/3227 |

* cited by examiner

*Primary Examiner* — James S. McClellan
(74) *Attorney, Agent, or Firm* — LEX IP MEISTER, PLLC

(57) ABSTRACT

To provide an information management system and a terminal device allowing an unregistered player to make cashless payment. A casino server includes a temporary account processing device creating a temporary account for storing money amount data and transmitting transaction information for specifying the created temporary account to the mobile device according to a request from the mobile device, the mobile device includes a first near-field transfer device transferring the transaction information transmitted from the casino server to the terminal device by near-field transfer, the terminal device includes a second near-field transfer device acquiring the transaction information transferred from the first near-field transfer device of the mobile device by near-field transfer and a temporary account processing device executing processing with respect to the temporary account on the casino server specified by the transaction information acquired by the second near-field transfer device through a communication method.

9 Claims, 19 Drawing Sheets

FIG. 13

| TRANSACTION NUMBER (TRANSACTION CODE) | ACCOUNT | PROCESSING INFORMATION | MEMBER NUMBER | PORTABLE TERMINAL IDENTIFIER | MONEY AMOUNT DATA (CREDIT DATA) | INFORMATION-CARD IDENTIFICATION INFORMATION |
|---|---|---|---|---|---|---|
| 00001 ■ MK | 010202 | PAYOUT | — | 0101111 | 2500PHP | — |
| 00002 | ME0143 | PAYOUT | 0000523 | (0102222) | 4000PHP | ME1111 |
| 00003 | ME0143 | WITHDRAWAL | 0000523 | (0102222) | 1000PHP | ME1111 |
| 00004 | 010001 | DEPOSIT | — | (0133333) | 2500PHP | GE0001 |
| 00005 ■ MK | 010202 | DEPOSIT | — | 0101111 | 2500PHP | — |
| 00006 ■ MK | 010202 | WITHDRAWAL | — | 0101111 | 500PHP | — |
| 00007 | 010001 | WITHDRAWAL | — | (0133333) | 2000PHP | GE0001 |
| 00008 | ME0143 | DEPOSIT | 0000523 | (0102222) | 1500PHP | ME1111 |
| ....... | ....... | ....... | ....... | ....... | ....... | ....... |

INFORMATION MANAGEMENT SYSTEM AND TERMINAL DEVICE

TECHNICAL FIELD

The present invention relates to an information management system and a terminal device in a casino and the like where gaming machines such as a slot machine are installed.

BACKGROUND ART

In a related art, known is a gaming machine called an EGM (Electronic Gaming Machine) that scroll-displays a symbol string on a display and re-arranges a plurality of symbols in a symbol display area where a plurality of pay lines are set. In the gaming machine, a player operates a control panel on which a plurality of buttons are arranged to determine the bet contents with respect to one game.

When playing a game in the above related-art gaming machine, the player inserts a bill into a bill validator of a PTS (Player Tracking System) terminal provided in the gaming machine, then, money amount information of the inserted bill is transmitted from the PTS terminal to the gaming machine, and the inserted money amount is converted into credit data for playing the game in the gaming machine.

Incidentally, in a casino hall where the gaming machines are installed, a player who has registered as a member can play games in the gaming machines by using a member card issued at the registration in related art. Specifically, when the member card is inserted into the gaming machine instead of cash, cash data stored in the member card or stored on a server so as to be associated with the member card can be inputted to the game to play the game. That is, a member player having the member card can play the game with so-called cashless payment without directly inserting cash into the gaming machine.

In the system in which the player who has registered as the member plays the game by using the member card as described above, playing the game with cashless payment presupposes that the member carries the members card; therefore, it is difficult to play the game with cashless payment as the member in a case where the player does not carry the member card.

As a measure for solving the above problem, a system in which the game is played with cashless payment by using a mobile device possessed by the member even when the member does not carry the member card is considered (refer to PTL 1).

CITATION LIST

Patent Literature

PTL 1: US-A-2019-0051107

SUMMARY OF INVENTION

Technical Problem

In the above system, the game play with cashless payment is realized by associating an application on the mobile device with the registered member.

However, it is difficult for a player not registering as a member to play the game with cashless payment.

The present invention has been made in consideration of the above-described circumstances, and an object thereof is to provide an information management system and a terminal device capable of making cashless payment also by an unregistered member.

Solution to Problems

An information management system according to the present invention includes a terminal device connected so as to communicate with a gaming machine capable of playing a game according to inputted currency, a casino server capable of communicating with the terminal device by a prescribed communication method, and a mobile device capable of communicating with the casino server, in which the casino server includes a temporary account processing device creating a temporary account for storing money amount data and transmitting transaction information for specifying the created temporary account to the mobile device in response to a request from the mobile device, the mobile device includes a first near-field transfer device transferring the transaction information transmitted from the casino server to the terminal device by near-field transfer, and the terminal device includes a second near-field transfer device acquiring the transaction information transferred from the first near-field transfer device of the mobile device by the near-field transfer and a temporary account processing device executing processing with respect to the temporary account on the casino server specified by the transaction information acquired by the second near-field transfer device through the communication method.

According to the above configuration, the temporary account is created on the casino server so as to be associated with the mobile device and the processing is performed to the temporary account, thereby reflecting a game result on the temporary account in a case where a non-member not registering as a member plays the game or in a case where a registered member plays the game without using a member card.

In the configuration of the information management system according to the present invention, the first near-field transfer device includes a display device displaying a prescribed transfer image based on the transaction information on a display part of the mobile device, and the second near-field transfer device includes an imaging device taking the transfer image displayed on the display device of the mobile device.

According to the above configuration, the transaction information can be transferred from the mobile device to the terminal device only when there actually exists the mobile device near the terminal device by imaging the transfer image displayed on the mobile device by the control device; therefore, the player actually having played the game in the gaming machine (terminal device) allows the control device to execute temporary account processing based on the transaction information. Accordingly, it is possible to prevent a behavior in which a false player not having played the game illegally executes the temporary account processing by a remote operation.

In the configuration of the information management system according to the present invention, the temporary account processing device stores money amount data paid out from the gaming machine in the casino server so as to be associated with the temporary account as processing with respect to the temporary account.

According to the above configuration, the temporary account is created on the casino server so as to be associated with the mobile device, and the money amount data paid out from the gaming machine is transferred to the temporary account and stored therein, thereby reflecting the money amount paid out as the result of the game on the temporary account even in the case where the non-member not registering as the member plays the game or in the case where the registered member plays the game without inserting the member card.

In the configuration of the information management system according to the present invention, the temporary account processing device transfers the money amount data stored in the casino server so as to be associated with the temporary account to the terminal device as processing with respect to the temporary account.

According to the above configuration, the money amount data associated with the temporary account on the casino server can be used in the gaming machine.

In the configuration of the information management system according to the present invention, the casino server includes a transfer device transferring the money amount data stored so as to be associated with the transaction information to an automated teller machine based on the transaction information transmitted from the automated teller machine.

According to the above configuration, the money amount data associated with the temporary account on the casino server can be withdrawn through the automated teller machine.

A terminal device according to the present invention is connected so as to communicate between a gaming machine capable of playing a game according to inputted currency and a casino server storing money amount data paid out from the gaming machine, which includes a near-field transfer device acquiring prescribed transaction information from a mobile device by near-field transfer, and a transmission device transmitting money amount data paid out from the gaming machine to the casino server so as to be associated with the transaction information based on the transaction information transferred by the near-field transfer.

According to the above configuration, the money amount data is transmitted from the terminal device to the casino server so as to be associated with the mobile device, thereby reflecting the money amount data paid out as the result of the game on the casino server even in the case where the non-member not registering as the member plays the game or in the case where the registered member plays the game without using the member card.

Advantageous Effects of Invention

According to the present invention, it is possible to provide an information management system and a terminal device allowing an unregistered player to make cashless payment.

BRIEF DESCRIPTION OF DRAWINGS

FIG. 13 is a chart illustrating transaction information registered on the casino server;

DESCRIPTION OF EMBODIMENTS

A gaming machine as an information processing apparatus according to the present invention will be explained with reference to the drawings.

[Entire Configuration of Information Management System]

Figure 1:
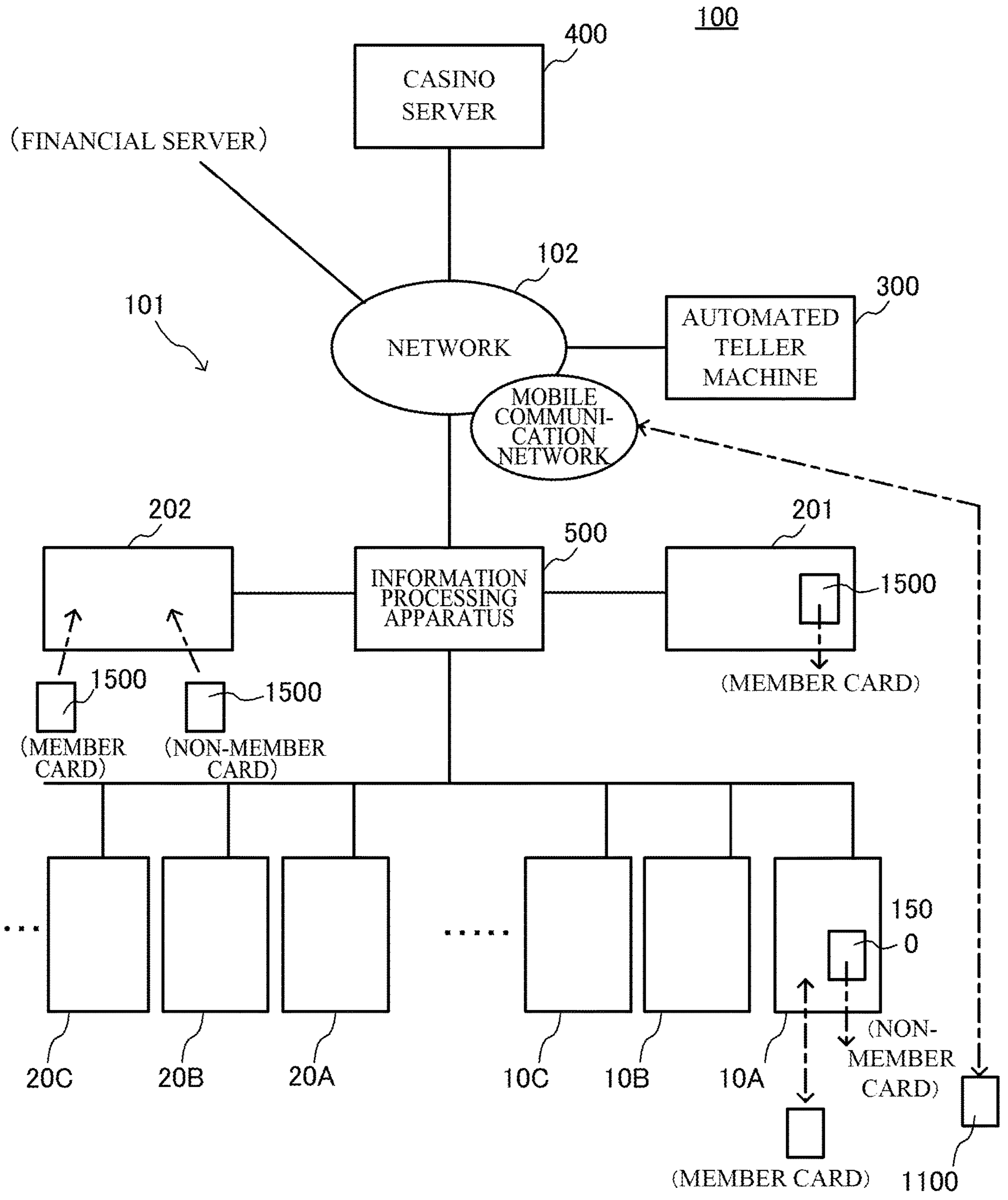
FIG. 1 is a block diagram illustrating the entire configuration of an information management system.

FIG. 1 is a block diagram illustrating an information management system 100 according to an embodiment of the present invention. As illustrated in FIG. 1, the information management system 100 includes a plurality of gaming machines (for example, slot machines 10A, 10B, . . . ) installed at a game facility such as a casino, and an information processing apparatus 500 connected so as to bidirectionally communicate with these machines. In the embodiment, the communication between the slot machines 10A, 10B, . . . and the information processing apparatus 500 is performed by PTS terminals 700 provided at respective slot machines 10A, 10B, . . . but it is also preferable that the slot machines 10A, 10B, . . . directly performs communication with the information processing apparatus 500.

The information processing apparatus 500 is connected to a network 102, and a casino server 400 and an automated teller machine (ATM) 300 are connected to the network 102. The casino server 400 is managed by an operating entity (namely, the operating entity of the system according to the embodiment) of the casino. A financial server of a bank and the like is also connected to the network 102.

A member information card issuing device 201 is connected to the information processing apparatus 500, and an IC card 1500 is issued in the member information card issuing device 201 as a member information card. The member information card stores unique information-card identification information (information card number (No)) for identifying the IC card 1500, and member information is accumulated in a member database in the information processing apparatus 500 so as to be associated with each information card number. When a player to be a member registers personal information (for example, name, address, phone number, nationality, passport number, and personal identification information for identify an individual issued by government or the like) in the member database as member information, the personal information is registered in the member database so as to be associated with the information-card identification information (information card number) for identifying the information card.

The information card to which the information card number is assigned is issued by the member information card issuing device 201, which will be used by the player registering as a member when playing games in the slot machines 10A, 10B, . . . (hereinafter referred to merely as a slot machine 10).

Figure 5:
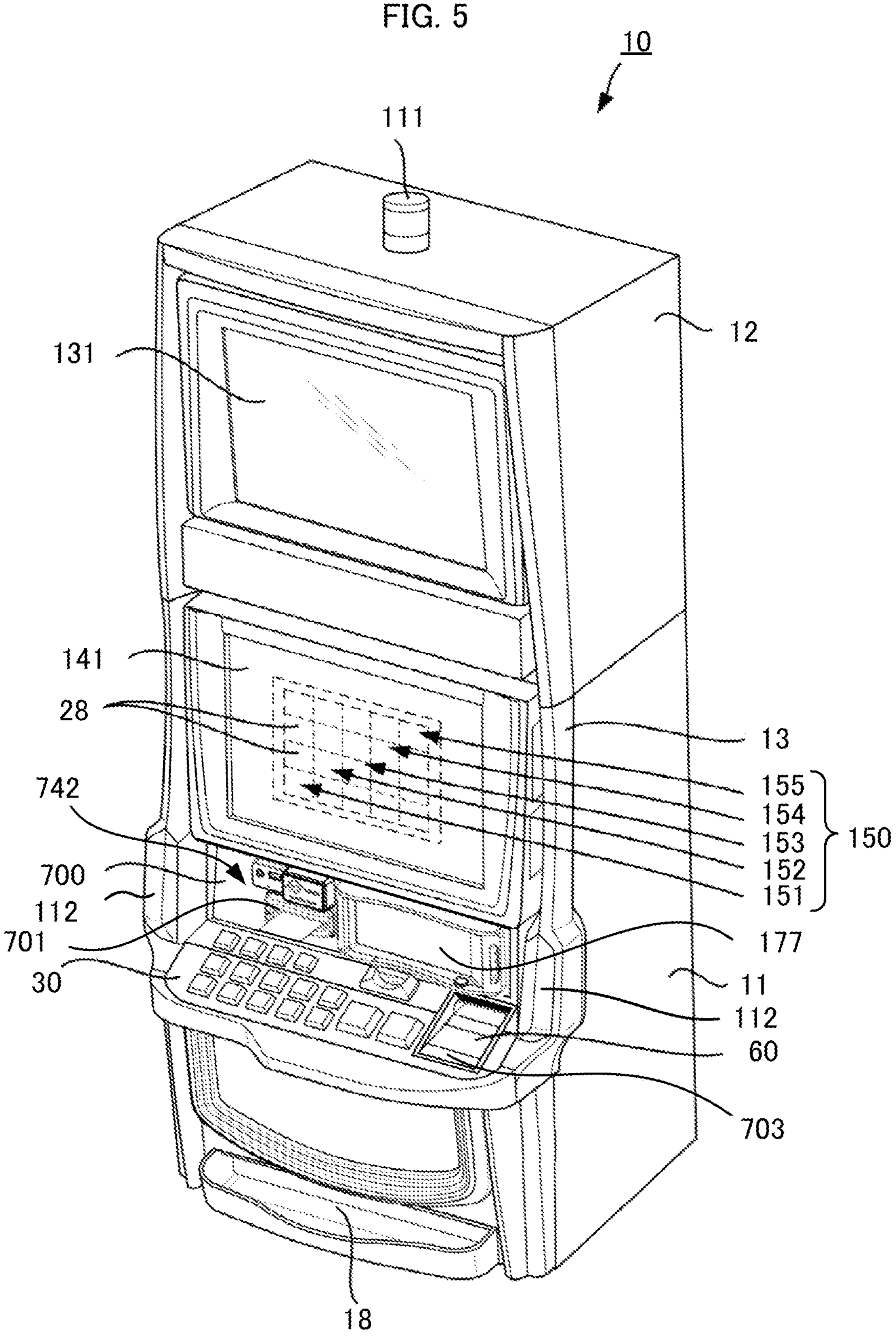
FIG. 5 is a perspective view illustrating an appearance of a slot machine.

Moreover, a cashier 202 for cashing based on the IC card 1500 (member information card) is connected to the information processing apparatus 500. When the player performing the game play by using the IC card 1500 as the member information card inserts the IC card 1500 ejected from the slot machine 10 after the game into a card reader of the cashier 202, cash corresponding to a balance possessed by the player associated with information-card identification information (information card number) of the IC card 1500 is paid out to the player. In the case of the embodiment, information of the balance associated with the member information card (IC card) is stored in an account for the member opened on the casino server 400 as balance data so as to be associated with the information-card identification information (card number) of the IC card 1500. In this case, the balance information stored in the casino server 400 so as to be associated with the information-card identification information (card number) of the IC card 1500 read by the card reader of the cashier 202 may be read out and cash may be withdrawn based on the information. It is also possible to perform cashing at the cashier 202 by a thicket delivered from the slot machine 10. In the slot machine 10, the ticket on which a payout amount is printed is delivered from a ticket printer 703 (FIG. 5). When the player brings the ticket to the cashier 202, the printed contents can be cashed.

In the information management system 100 according to the embodiment, the game can be played by inserting a non-member information card (IC card 1500) into the slot machine 10. The non-member information card is the IC card 1500 to be issued for a player not registering as a member or a player not carrying the member information card though the player has registered as the member, which is issued when the above players temporarily play games in the casino. When the non-member information card is issued, an account for the non-member is opened on the casino server 400 so as to be associated with unique information-card identification information of the non-member information card. The player inserts cash in advance to thereby pool cash in the account for the non-member. When playing games by inserting the non-member information card into the slot machine 10 after the non-member information card is issued, information of cash pooled in the account for the non-member on the casino server 400 is transferred to the slot machines 10A, 10B, . . . and used for the games. Then, information indicating a dividend generated in accordance with a game result is transmitted from the slot machine 10 (PTS terminal 700) to the casino server 400 with the information-card identification information and stored in the account for the non-member corresponding to the information-card identification information. In this case, the non-member information card inserted in the slot machine 10 (PTS terminal 700) is delivered to the player. The player having the non-member information card inserts the non-member information card into an information card reader at the prescribed cashier 202, thereby receiving cash stored in the account for the non-member.

In the information management system 100 according to the embodiment, when the game is played by inserting cash in a state where neither the member information card nor the non-member information card is inserted into the slot machine 10, the player may select, as a payout method of the dividend generated as the game result, any of a method in which the dividend is directly paid out to the player by cash (including a thicket that can be cashed), a method in which, instead of cash payout, the account for the non-member is opened on the casino server 400, information of a dividend (information indicating an amount) is transferred to be stored there, and the non-member information card associated with the account is newly issued from the slot machine 10 (PTS terminal 700) and a method in which a temporary account (transient account) is opened on the casino server 400 by an application program (mobile application) of a mobile device (portable terminal device) 1100 (described later) possessed by the player, data of a money amount (credit) paid out from the slot machine 10 such as the dividend is transferred and stored in the temporary account. After the temporary account is opened on the casino server 400 by using the application program of the mobile device 1100, the gaming machine or the automated teller machine 300 (described later) is operated through the application program of the mobile device 1100, thereby performing processing such as the transfer of cash (credit) data to the temporary account on the casino server 400 or withdrawal from the temporary account.

That is, after the temporary account is made on the casino server 400 by using the application program of the mobile device 1100 once in the information management system 100, it is possible to access the temporary account by operating the gaming machine or the automated teller machine 300 (described later) through the application program of the mobile device 1100 (the details will be described later).

Moreover, table game machines 20A, 20B, . . . for playing table games which are so-called casino tables such as a baccarat game and a roulette game are also connected to the information processing apparatus 500. The table game machines 20A, 20B, . . . include, for example, a game board, a card shoe, a display for a dealer, a chip tray, a control unit for controlling the above, and so on when the game machines are for playing card games.

Figure 2:
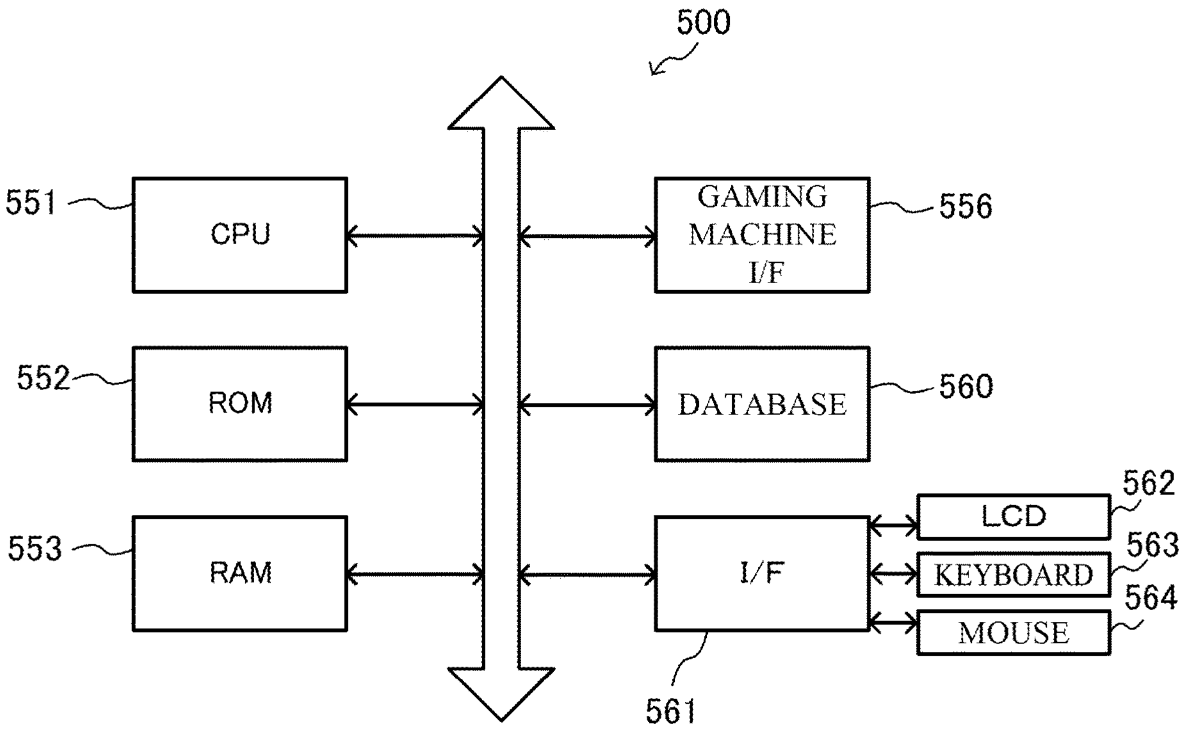
FIG. 2 is a block diagram illustrating a configuration of an information processing apparatus.

FIG. 2 is a block diagram illustrating a configuration of the information processing apparatus 500. As illustrated in FIG. 2, the information processing apparatus 500 has a configuration in which a CPU (Central Processing Unit) 551, a ROM (Read Only Memory) 552, a RAM (Random Access memory) 553, a gaming machine I/F 556, a database 560, I/F 561, an LCD (Liquid Crystal Display) 562, a keyboard 563, a mouse 564, and so on are connected to a bus. In the database 560, member information associated with an information card number, balance information and game history information associated with the IC card 1500 issued for the member, balance information and game history information associated with the IC card 1500 issued for the non-member, and so on are stored.

Figure 3:
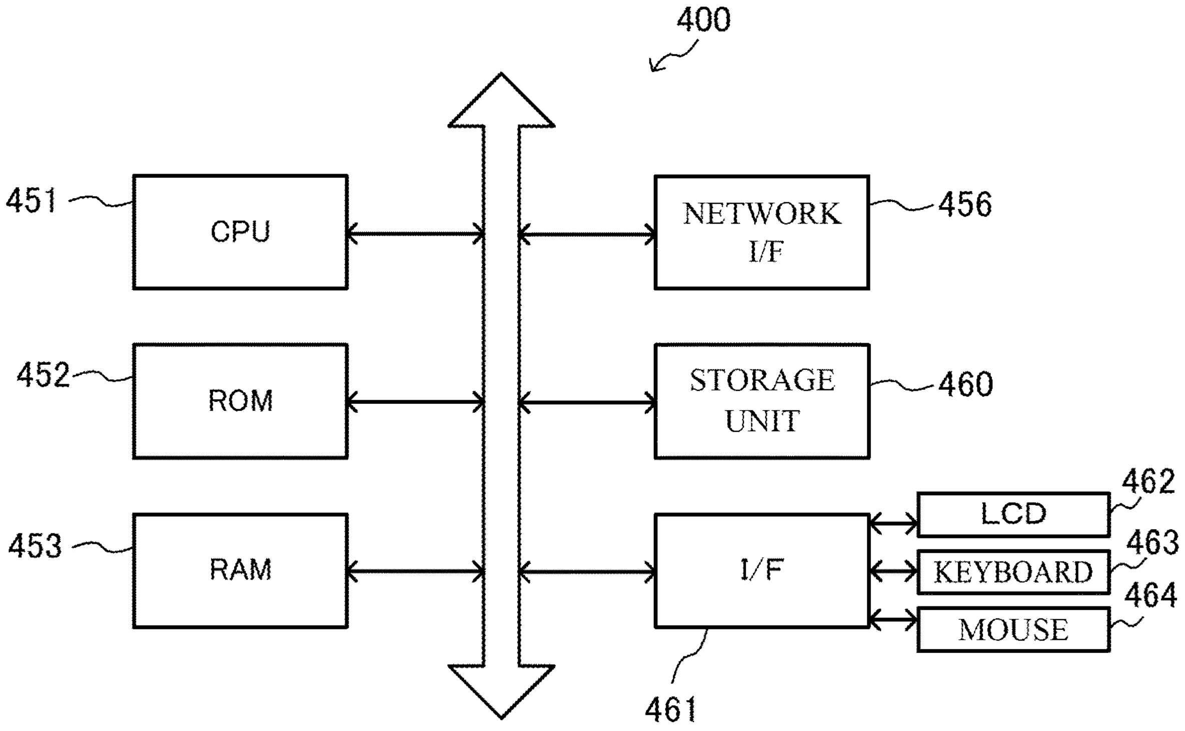
FIG. 3 is a block diagram illustrating a configuration of a casino server.

FIG. 3 is a block diagram illustrating a configuration of the casino server 400. As illustrated in FIG. 3, the casino server 400 has a configuration in which a CPU 451, a ROM (Read Only Memory) 452, a RAM 453, a network I/F 456, a storage unit 460, an I/F 461, an LCD 462, a keyboard 463, a mouse 464, and so on are connected to a bus. In the storage unit 460, a storage area for a temporary account or the like associated with a transaction code (described later) is secured.

Figure 4:
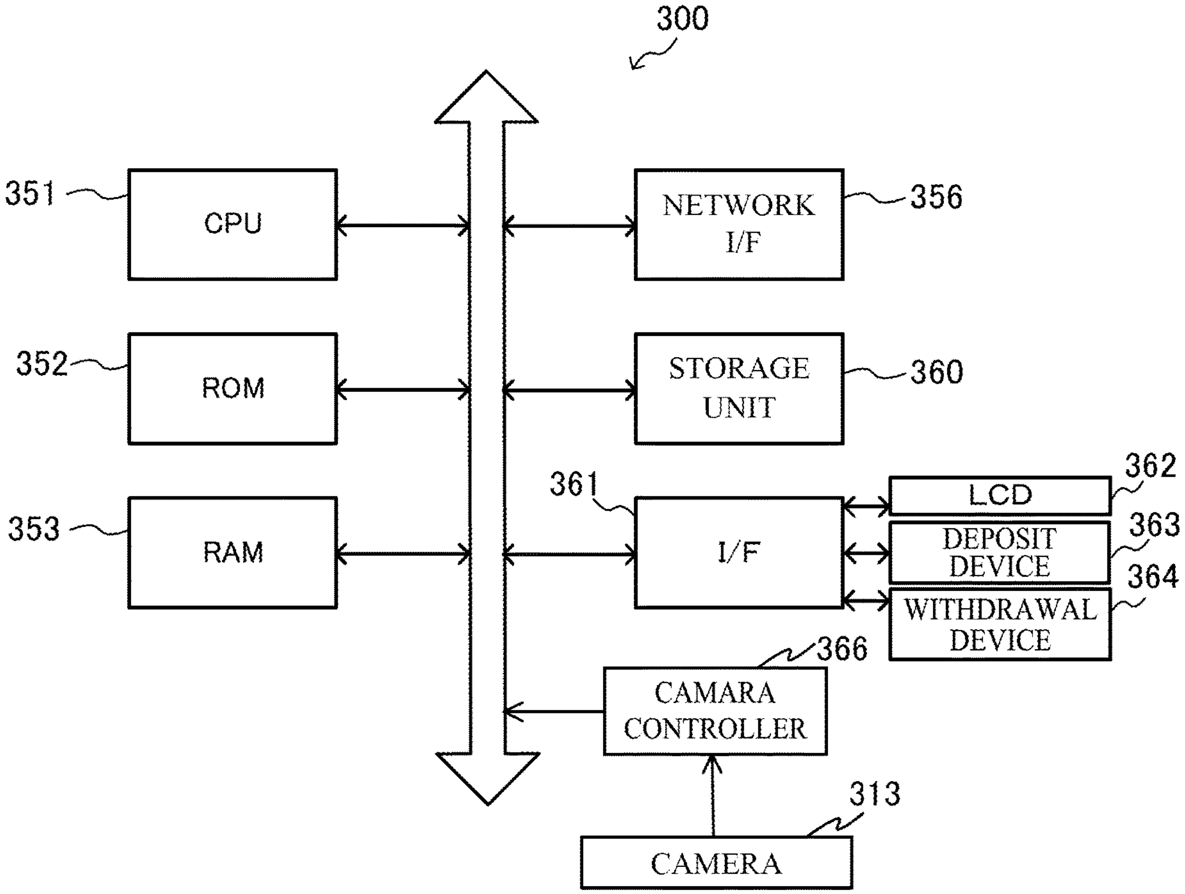
FIG. 4 is a block diagram illustrating a configuration of an automated teller machine.

Moreover, FIG. 4 is a block diagram illustrating a configuration of the automated teller machine 300. As illustrated in FIG. 4, the automated teller machine 300 has a configuration in which a CPU 351, a ROM 352, a RAM 353, a network I/F 356, a storage unit 360, an I/F 361, an LCD 362, an operation unit 363, a deposit/withdrawal device 364, a camera controller 366, a camera 313, and so on are connected to a bus.

Furthermore, in the information management system 100 according to the embodiment, the account associated with the mobile device 1100 is created on the casino server 400 and stored in the storage unit 460 and the transaction code for specifying the account is transmitted to the mobile device 200 by the mobile device 1100 possessed by the player performing communication with the casino server 400. The mobile device 1100 which has received the transaction code can store the transaction code in a storage unit of the mobile device 1100 and can display the transaction code on a display part of the mobile device 1100 as code display such as a matrix two-dimensional code (for example, a QR code (registered trademark)) and the like.

The above display is imaged by a camera 713 (FIG. 7) of the PTS terminal 700 provided at each slot machine 10, and the PTS terminal 700 transmits cashout data indicating the money amount paid out from the slot machine 10 to the casino server 400 through the information processing apparatus 500 and the network 102 with information of the imaged matrix two-dimensional code.

The casino server 400 specifies the account created so as to be associated with the mobile device 1100 based on the information of the matrix two-dimensional code transmitted from the PTS terminal 700 and stores the cashout data (credit data) transmitted from the PTS terminal 700 with the information of the matrix two-dimensional code in the specified account.

Accordingly, the payout amount (credit data) paid out to the account associated with the mobile device 1100 from the slot machine 10 having the PTS terminal 700 which has imaged the matrix two-dimensional code displayed on the mobile device 1100 is moved to the account from the slot machine 10. That is, information indicating the amount of cash is moved to the account associated with the mobile device 1100 instead of the payout of cash from the slot machine 10, thereby realizing the payout to the player. The details will be described later.

In the embodiment, the display part of the mobile device 1100 and the camera 713 of the PTS terminal 700 configure first and second near-field transfer devices which transfer the transaction code represented by the matrix two-dimensional code from the mobile device 1100 to the PTS terminal 700.

[Entire Configuration of Slot Machine]

The entire configuration of the slot machine 10 will be explained.

In the slot machine 10, bills, coins, medals, tokens, tickets with barcodes and so on are adopted as game values in addition to electronic valuable information such as electronic money.

As illustrated in FIG. 5, a lower image display panel 141 is provided at the center on the front of a casing 11 of the slot machine 10. The lower image display panel 141 is formed of a liquid crystal panel and configures a display. The lower image display panel 141 includes a symbol display area 150 displaying images of a plurality of video reels 151 to 155. Lamps 112 used for effects are provided at parts of a front panel 13. Various types of notification lamps 111 are provided on the top of the slot machine 10.

In the embodiment, the video reels artificially express actions of rotations and stops of mechanical reels in which a plurality of symbols are drawn on peripheral surfaces thereof by video. A symbol string including a plurality of symbols is assigned to the video reel.

An upper image display panel 131 is provided on the front of an upper casing 12 above the lower image display panel 141. The upper image display panel 131 is formed of a liquid crystal panel and configures a display. The upper image display panel 131 displays images relating to effects and images illustrating introduction of the game contents and explanation for rules.

A control panel 30 on which various types of buttons are disposed, the PTS terminal 700 having functions as a conversion device, and a bill entry 60 are provided below the lower image display panel 141. In the embodiment of the present invention, the PTS terminal 700 and the bill entry (bill validator) 60 are included as terminal devices managing currency information (information of a currency unit, the money amount represented by the currency unit, the number of credits corresponding to the money amount, and so on) relating to bet processing, processing of giving a dividend, and the like in the slot machine 10 (a game controller 70) as the information processing apparatus; however, the PTS terminal 700 may be applied as a concept of the terminal device by itself.

The bill entry 60 validates whether the bill is suitable or not and receives a legitimate bill in the slot machine 10. The bill entry 60 is electrically connected to the PTS terminal 700, transmitting an input signal corresponding to an amount of the bill to the PTS terminal 700 when receiving the legitimate bill.

The embodiment has a concept of currency information (for example, "1 php, 1 credit") in addition to inserted currency information of the bill inserted into the bill entry 60. This currency information is the concept including the currency unit ("php (Philippine peso)", "usd (U.S. dollar)", "jpy (Yen)" and the like), money amount information represented by the currency unit (for example, "1 php" and the like), and the number of credits (for example, "1 php, 1 credit" and the like) corresponding to the money amount information.

The PTS terminal 700 includes an LCD (liquid crystal display) 177, and the LCD 177 includes a touch panel on a display screen, having a function as a touch-operation input unit by the player in addition to the function of displaying images. The PTS terminal 700 is a unit in which the camera 713, a microphone 715, a speaker 707, and the like are integrally provided. The camera 713 images the transaction code (described later) displayed on a display screen of the mobile device 1100 possessed by the player by a camera function. The microphone is used for the player participating in a game by voice or for identifying the player by voice recognition. A card insertion slot 701 is further provided in the PTS terminal 700, into which the IC card can be inserted. According to the above, the player can use cash data stored in the IC card in the slot machine 10 by inserting the IC card into the card insertion slot.

That is, the slot machine 10 can read unique information-card identification information (card number) assigned to the IC card 1500 by an IC card R/W 742 connected to the PTS terminal 700 with respect to the IC card (the member information card or the non-member information card) 1500 inserted from the card insertion slot 701 provided in the PTS terminal 700. The player receives balance information indicating a cash balance stored in the casino server 400 so as to be associated with the inserted IC card 1500 from the casino server 400 by inserting the IC card 1500 and transmits the information to the slot machine 10.

Specifically, when the IC card 1500 of the member (member information card) is issued by the member information card issuing device 201 (FIG. 1), the account for the member is opened on the casino server 400 so as to be associated with the information-card identification information (card number) of the member information card to be issued. That is, the player inputs required fields such as personal information in the member information card issuing device 201 and registers the required fields in the member database of the information management apparatus 500, thereby opening the account for the member on the casino server 400 and receiving issuing of the member information card (IC card 1500). In this case, when the player inserts money (cash) into the member information card issuing device 201, the amount of cash is converted into cash data usable in the slot machine 10 and stored in the corresponding account on the casino server 400. When the player inserts the member information card (IC card 1500) associated with the account for the member into the card insertion slot 701 (FIG. 5) of the slot machine 10, the PTS terminal 700 provided in the slot machine 10 reads information-card identification information stored in the IC card 1500, reading cash (credit) data of an amount necessary for playing the game from the account for the member on the casino server 400 associated with the information-card identification information and transmits the data to the slot machine 10.

Accordingly, the cash data read from the account for the member corresponding to the member information card (IC card 1500) inserted into the card insertion slot 701 can be used for the game in the slot machine 10.

Also in a case where the inserted IC card 1500 is the non-member information card, cash data read from the account for the non-member opened on the casino server 400 can be used for the game performed in the slot machine 10 in the same manner.

When cash is inserted, the cash inserted into the slot machine 10 is used for the game.

Moreover, cash data read from the temporary account opened on the casino server 400 by the application program of the mobile device 1100 can be used for the game performed in the slot machine 10.

Processing in the PTS terminal 700 executed when cash or the IC card 1500 is inserted will be explained later.

When a payout with respect to the player is generated such as a case where a dividend is generated as a result of the game in the slot machine 10, a payout method is determined due to selection by the player. Specifically, when the member information card (IC card 1500) is inserted into the slot machine 10 (PTS terminal 700) and the game is performed, the dividend is transferred to the account for the member opened on the casino server 400 so as to be associated with the member information card and stored therein.

On the other hand, when the non-member information card (IC card 1500) is inserted into the slot machine 10 (PTS terminal 700) and the game is performed, the player can select, as the payout method, any of a method in which the dividend is transferred to the account for the non-member opened on the casino server 400 so as to be associated with the non-member information card and stored therein, a method in which the temporary account is opened on the casino server 400 by the application program of the mobile device 1100 and the dividend is transferred to the account and stored therein, and a method in which cash (including a ticket that can be cashed) is directly paid out to the player.

When cash is inserted into the slot machine 10 (PTS terminal 700) and the game is performed, the player can select, as the payout method, any of a method in which the non-member information card is newly issued and the account for the non-member associated with the information-card identification information of the non-member information card is opened on the casino server 400, the method in which the temporary account is opened on the casino server 400 by the application program of the mobile device 1100 and the dividend is transferred to the account and stored therein, and the method in which cash (including the ticket that can be cashed) is directly paid out to the player.

Processing of selecting the method for paying out the dividend of the game performed by inserting the non-member information card or cash will be described later.

[Internal Configurations Included in Slot Machine]

Figure 6:
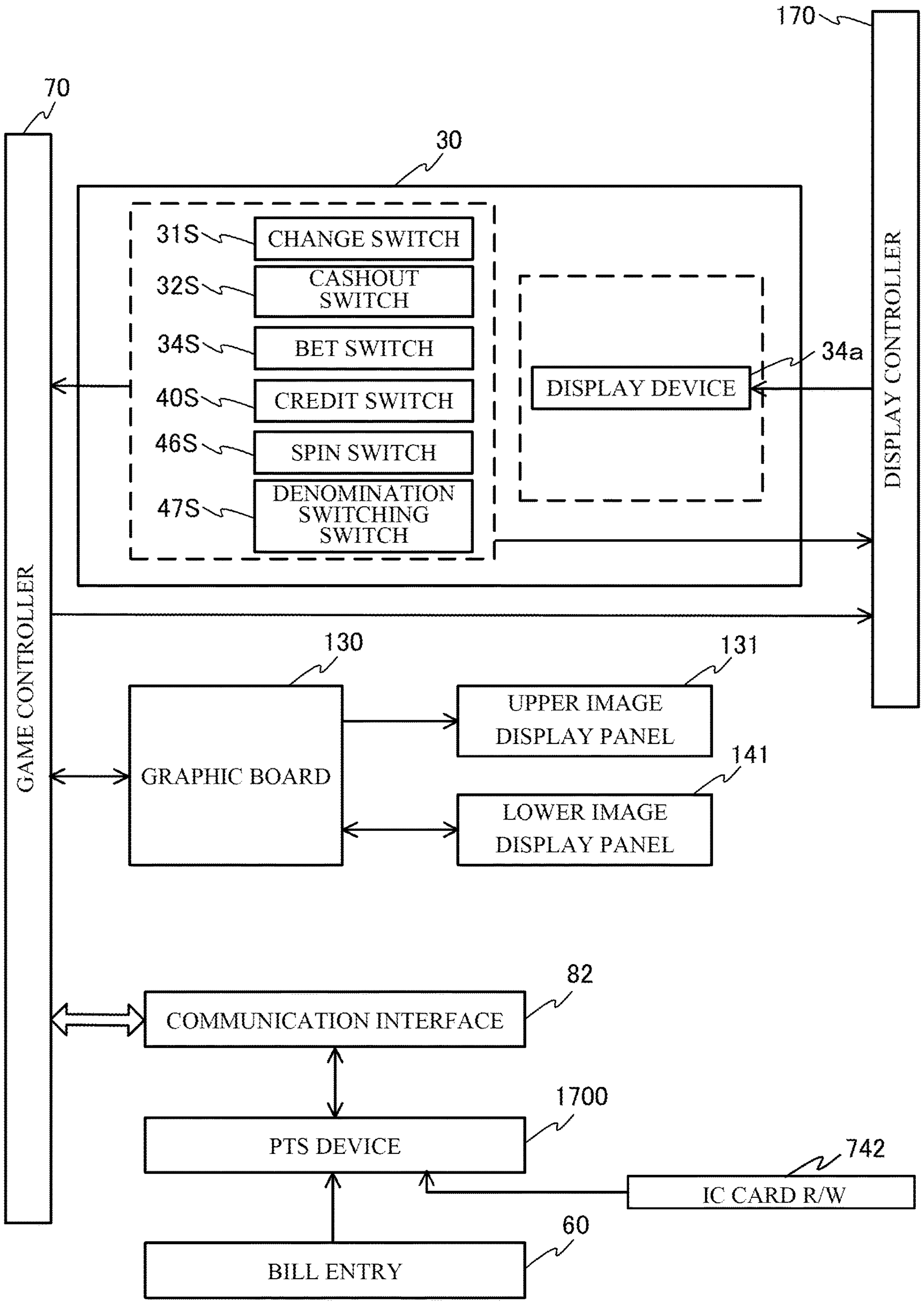
FIG. 6 is a block diagram illustrating an internal configuration of the slot machine.

Next, internal configurations of the slot machine 10 and the control panel 30 provided in the slot machine 10 will be explained with reference to FIG. 6.

The game controller 70 is provided on a game circuit board inside the slot machine 10. A display controller 170 is provided on a circuit board for the control panel different from the game circuit board of the game controller 70 inside the control panel. The game controller 70 and the display controller 170 each includes a CPU (Central Processing Unit), an EEPROM (Electrically Erasable and Programmable Read Only Memory) storing programs executed by the CPU and data used for these programs so as to be rewritable, and a RAM (Random Access Memory) temporarily storing data at the time of executing programs which are respectively provided at the game circuit board and at the circuit board for the control panel. The game controller 70 and the display controller 170 are built by these hardware and software in the above storage devices in cooperation with each other. It is not always necessary to provide the display controller 170 separately from the game controller 70, and the game controller 70 may have functions of the display controller 170.

For example, data and programs used when the CPU operates are stored in storage devices of the game controller 70. For example, the game controller 70 can store the game program, a game system program or an authentication program when importing these programs from an external storage device. The storage device of the game controller 70 is provided with working areas used when executing the programs. For example, an area for storing the number of times of games, the number of BETs, the number of payouts, the number of credits and the like, an area for storing symbols (code numbers) determined by a lottery, and the like are provided.

The game controller 70 performs the game as described above and controls the symbol display device 150 so that symbols are rearranged in accordance with the game. The game controller 70 makes the number of effective lines corresponding to credit buttons inputs of which have been received effective on display frames of three rows and five columns formed of a plurality of blocks as described above. When the predetermined number or more of symbols of the same kind are rearranged in the effective lines which have been made effective, the game controller 70 gives a line dividend corresponding to the symbols of the kind. That is, the game controller 70 is configured to control the slot machine by executing the game program or the game system program in the storage device by the CPU. The display controller 170 includes a graphic board, displaying a bet amount on display parts of the credit buttons.

On the control panel 30, a CHANGE switch 31S, a CASHOUT switch 32S, a BET switch 34S, a credit switch 40S, a spin switch 46S, and a denomination switching switch 47S are provided so as to correspond to the above respective buttons. Respective switches detect that corresponding buttons are pushed by the player, outputting signals to the game controller 70 and the display controller 170. The game controller 70 controls BETs based on the signals from respective switches. The display controller 170 transmits the signals from respective switches to the game controller 70, and the game controller 70 determines the contents to be displayed on the display parts provided at the credit buttons based on these signals and transmits the determined result to the display controller 170, thereby allowing respective buttons to display the result.

Moreover, a graphic board 130, a power supply unit (not illustrated), and a communication interface 82 are connected to the game controller 70 in addition to a speaker, a touch panel, and the like.

The graphic board 130 controls image display respectively performed by the upper image display panel 131 and the lower image display panel 141 based on a control signal outputted from the game controller 70. The graphic board 130 includes a VDP generating image data, a video RAM storing image data generated by the VDP, and the like.

The graphic board 130 includes the VDP (Video Display Processor) generating image data based on the control signal outputted from the game controller 70, the video RAM temporarily storing image data generated by the VDP, and the like. The image data used when generating the image data by the VDP is included in the game program in the storage device. The graphic board 130 has a function of outputting operation results of various types of touch icons provided on the lower image display panel 141 to the game controller 70.

The communication interface 82 is for performing communication with the PTS terminal 700 or an external control device. The PTS terminal 700, when receiving an input signal from the bill entry 60, transmits inserted currency information contained in the input signal to the game controller 70 through the communication interface 82. When the IC card is inserted into the card insertion slot, the PTS terminal 700 transmits money amount data stored in the IC card to the game controller 70 through the communication interface 82. The PTS terminal 700 also writes the money amount data in the IC card inserted into the card insertion slot based on the control signal received from the game controller 70 through the communication interface 82. When transmitting the money amount data to the casino server 400, the money amount data is not written in the IC card 1500.

[Configuration of PTS Terminal]

Figure 7:
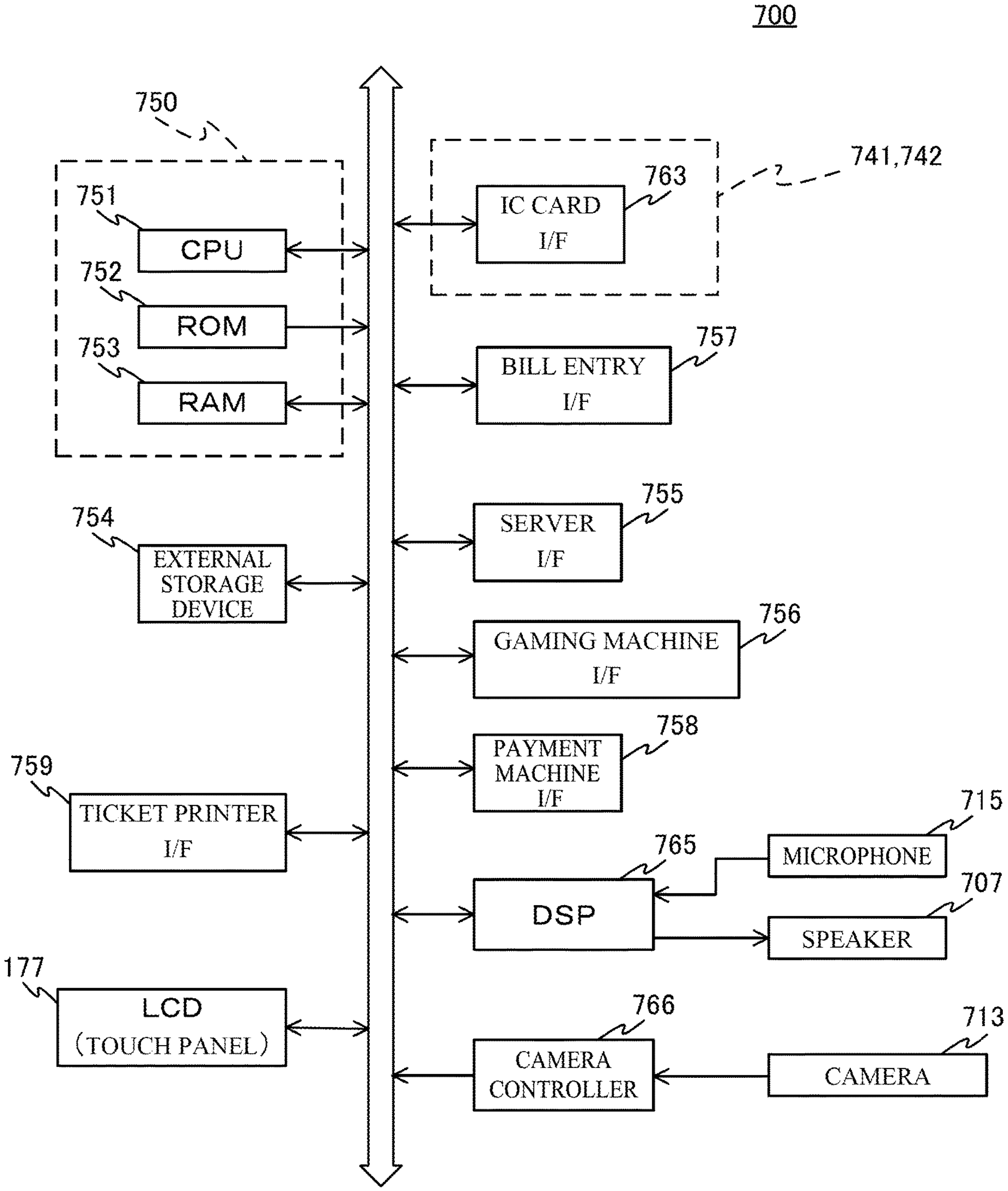
FIG. 7 is a block diagram illustrating an internal configuration of a PTS terminal.

Next, internal configurations included in the PTS terminal 700 will be explained with reference to FIG. 7.

A PTS controller 750 controlling the PTS terminal 700 includes a CPU 751, a ROM 752, and a RAM 753.

The CPU 751 controls execution of respective components of the PTS terminal 700, executing various programs stored in the ROM 752 and performing computing operations.

The ROM 752 is formed of a memory device such as a flash memory, storing permanent data executed by the CPU 751. For example, the ROM 752 can store a credit update program that rewrites credit related data (money amount data) stored in the IC card (not illustrated) connected through an IC card I/F (interface) 763, and the like.

The RAM 753 temporarily stores data necessary when executing various programs stored in the ROM 752.

An external storage device 754 is a storage device such as a hard disk device, storing programs executed in the CPU 751 and data used by programs executed in the CPU 751.

A server I/F (interface) 755 realizes data communication between the information processing apparatus 500 such as a hall management server or other servers and the PTS terminal 700. A gaming machine I/F (interface) 756 realizes data communication between the game controller 70 and the PTS terminal 700 of the slot machine 10 through the communication interface 82 (FIG. 7) on the slot machine 10, and a prescribed protocol can be used for the data communication. The PTS terminal 700 is configured to perform transmission/reception of information with respect to the casino server 400 connected to the information processing apparatus 500 through the network 102 (FIG. 1) by communicating with the information processing apparatus 500 through the server I/F 755.

Additionally, the PTS terminal 700 is connected to the bill entry 60 which is a bill validator through a bill entry I/F (interface) 757 and connected to a payment machine (not illustrated) through a payment machine I/F (interface) 758 so as to perform transmission/reception of data to and from these machines according to need.

An IC card controller 741 controls insertion/ejection of the IC card, writing of the money amount data, and the like. The IC card controller 741 includes an IC card R/W controller that controls the IC card R/W (reader/writer) 742 (FIG. 3), an IC card insertion/ejection controller, an LED controller, and the like.

A DSP 765 receives voice data acquired from the microphone 715 and performs prescribed voice processing, then, transmits the data to the CPU 751. The DSP 765 also transmits the received voice data to the speaker 707. The DSP 765 further outputs received voice to headphones, that is, an audio terminal to which a head set is connected and processes voice received from the microphone to transmit the voice to the CPU 751. Note that schematic configurations are illustrated here and an A/D converter, a D/A converter, an amplifier, and the like are not illustrated.

A camera controller 766 acquires images on the display screen (the transaction code and the like) of the mobile device 1100 imaged by the camera 713 and performs prescribed image processing according to need, then, transmits the processed data to the CPU 751. The data is transmitted to, for example, the information processing apparatus 500, the casino server 400, and the like through the server I/F 755.

Moreover, the ticket printer 703 (FIG. 5) is connected through a ticket printer I/F 759, and a ticket on which a payout amount is printed is delivered from the ticket printer 703. The ticket is for being cashed in the cashier 202 (FIG. 1) in a casino facility. When the money amount data is transmitted to the casino server 400, the ticket on which the payout amount is printed is not delivered from the ticket printer 703.

The LCD 177 is connected to the PTS terminal 700, and the touch panel is installed together in the LCD 177, which can accept touch operations by the player.

[Input Processing]

Figure 8:
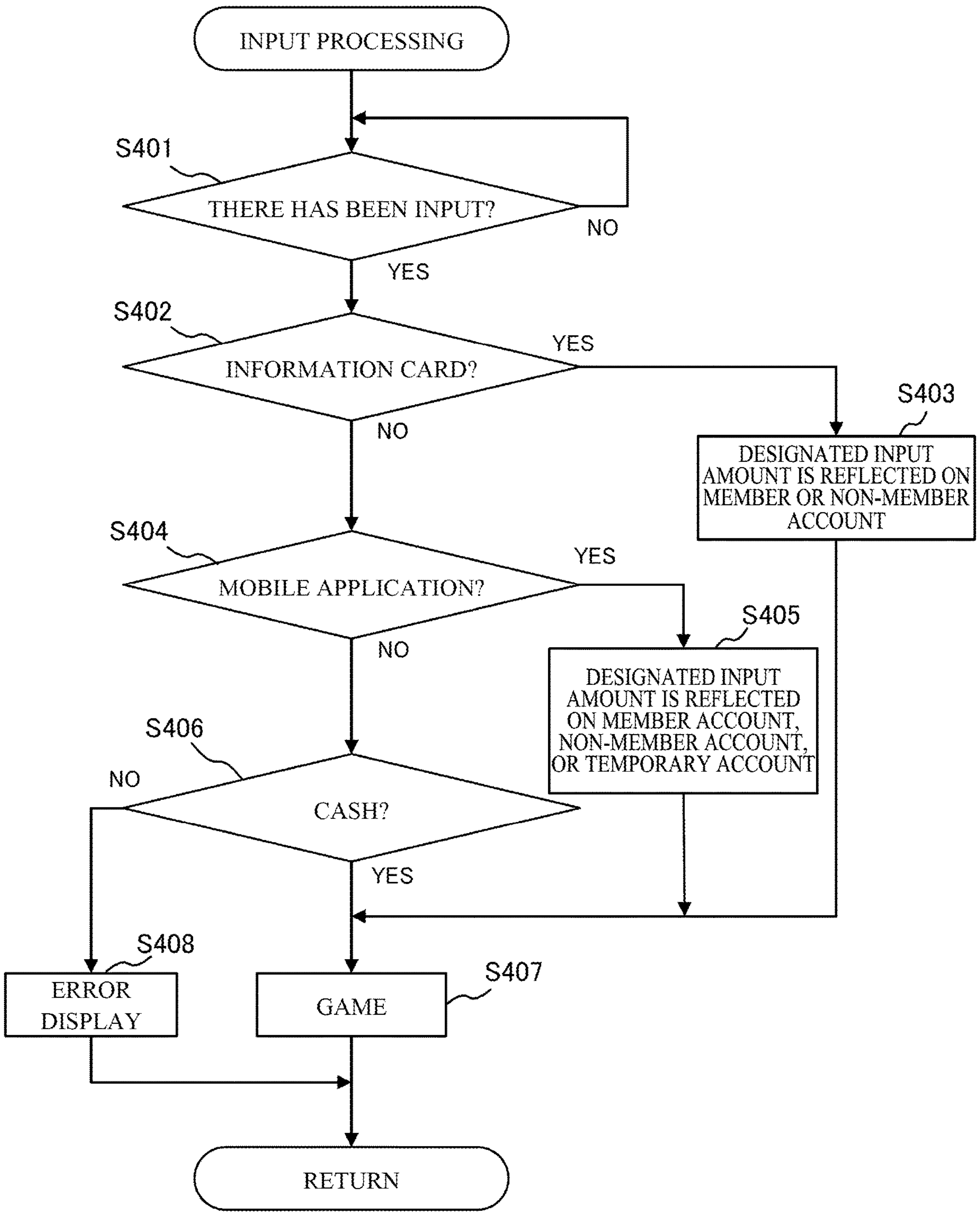
FIG. 8 is a flowchart illustrating input processing at the PTS terminal.

FIG. 8 is a flowchart illustrating input processing by the PTS terminal 700 (CPU 751). The PTS terminal 700 determines whether there has been insertion of cash, insertion of the IC card, or input of cash data through the application program (mobile application) of the mobile device 1100 or not at Step S401. When there is not any of insertions, a negative result is obtained at Step S401, and the same processing is repeated.

On the other hand, when there is any of insertions, the PTS terminal 700 obtains an affirmative result of the step and makes the process proceed from Step S401 to Step S402, determining whether the inserted medium is the information card (IC card 1500) or not.

When the inserted medium is the information card (IC card 1500), the PTS terminal 700 obtains an affirmative result at Step S402 and makes the process proceed from Step S402 to Step S403, displaying a menu for designating the money amount on the display part (LCD 177) of the PTS terminal 700 and transmitting an input amount (an amount used for the game) inputted by the player operating the LCD (touch panel) 177 to the casino server 400 to thereby allow the input amount to be reflected on the balance of the account (the account for the member or the account for the non-member) on the casino server 400 associated with information-card identification information (information card number) of the information card (the member information card or the non-member information card) inserted at this time. That is, the input amount designated at this time is subtracted from the balance of the corresponding account on the casino server 400. Then, the PTS terminal 700 makes the process proceed to Step S407 after the process at Step S403.

When the inserted medium is not the information card (IC card 1500), the PTS terminal 700 obtains a negative result at Step S402 and makes the process proceed from Step S402 to Step S404, determining whether input of cash data through the application program (mobile application) of the mobile device 1100 is designated or not. In a case where the player designates the input of cash data to the slot machine 10 through the application program of the mobile device 1100 by operating the LCD (touch panel) 177 of the PTS terminal 700, the PTS terminal 700 obtains an affirmative result at Step S404 and makes the process proceed from Step S404 to Step S405, performing display for prompting the player to operate the mobile device 1100 on the display part (LCD 177) of the PTS terminal 700 to thereby make the player input all or part of the balance of the account for the member, the account for the non-member, or the temporary account on the casino server 400 to the game of the slot machine 10 through the application program of the mobile device 1100 based on the input operation of the mobile device 1100 by the player, and to thereby allow the input amount to be reflected on the balance of the account for the member, the account for the non-member, or the temporary account by subtracting the input amount from the balance of the account (the details will be described later). Then, the PTS terminal 700 makes the process proceed to Step S407 after the process of Step S405.

Moreover, when the inserted medium is neither the information card (IC card 1500) nor the cash data by the application program of the mobile device 1100, the PTS terminal 700 obtains a negative result at Step S404 and makes the process proceed from Step S404 to Step S406, determining whether the inserted medium is cash or not. When cash is inserted into the bill entry 60, the PTS terminal 700 obtains an affirmative result at Step S406 and makes the process proceed from Step S406 to Step S407.

The PTS terminal 700 executes the game in accordance with the input amount inputted for playing the game at Step S407.

When the inserted medium is not any of the information card (IC card 1500), cash data by the application program of the mobile device 1100 and cash, the PTS terminal obtains a negative result at Step S406 and makes the process to proceed to Step S408, performing an error display on the LCD 177.

As described above, the PTS terminal 700 can execute input processing of the game medium (cash data or cash) in accordance with the type of the inserted medium.

[Payout Processing in PTS Terminal]

Figure 9:
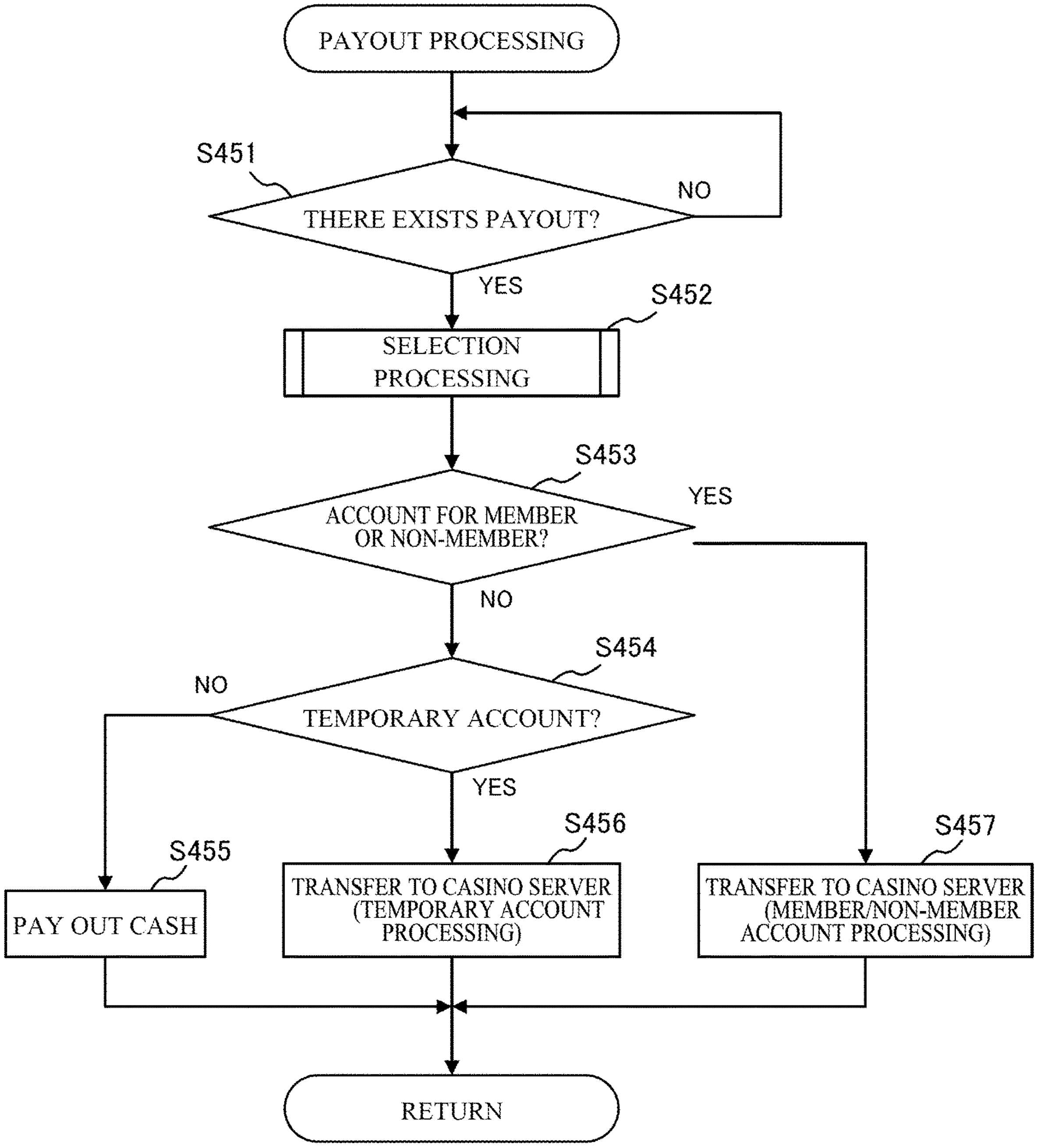
FIG. 9 is a flowchart illustrating payout processing at the PTS terminal.

FIG. 9 is a flowchart illustrating payout processing of a game dividend by the PTS terminal 700. The PTS terminal 700 determines whether there exists a payout or not, namely, whether the player has operated a cashout button of the slot machine 10 or not based on information from the slot machine 10 at Step S451.

In a case where the player has operated the cashout button, the PTS terminal 700 obtains an affirmative result at Step S451 and makes the process proceed from Step S451 to Step S452, performing selection processing of the payout method (described later). When the payout (transfer) to the account for the member or the non-member is selected as the result of selection processing, the PTS terminal 700 obtains an affirmative result at Step S453 and makes the processing proceed from Step S453 to Step S457, transferring data indicating the amount relating to the payout and information for specifying the account for the member or the non-member (the information-card identification information of the IC card 1500 (the member information card or the non-member information card) inserted in the slot (the PTS terminal 700) at this time and information relating to the mobile device 1100) to the casino server 400. The casino server 400 stores the amount relating to the payout to the account for the member or the non-member associated with information-card identification information and information relating to the mobile device 1100.

On the other hand, when the selection result in the selection processing (S452) is not the transfer to the account for the member or the non-member, the PTS terminal 700 obtains a negative result at Step S453 and makes the process proceed from Step S453 to Step S454, determining whether the selection result in the selection processing (S452) is the payout (transfer) to the temporary account or not. When the payout (transfer) to the temporary account is selected, the PTS terminal 700 obtains an affirmative result at Step S454 and makes the process proceed from Step S454 to Step S456, transferring data indicating the amount relating to the payout and information for specifying the temporary account (a transaction code created in the casino server 400 by the application program of the mobile device 1100 (the details will be described later)) to the casino server 400. The casino server 400 stores the amount relating to the payout in the temporary account opened so as to be associated with the transaction code.

Moreover, when the selection result in the selection processing (S452) is neither the transfer to the account for the member or the non-member nor the transfer to the temporary account, the PTS terminal 700 obtains a negative result at Step S454 and makes the process proceed from Step S454 to Step S455, performing processing of paying out cash directly to the player.

[Selection Processing in PTS Terminal]

Figure 10:
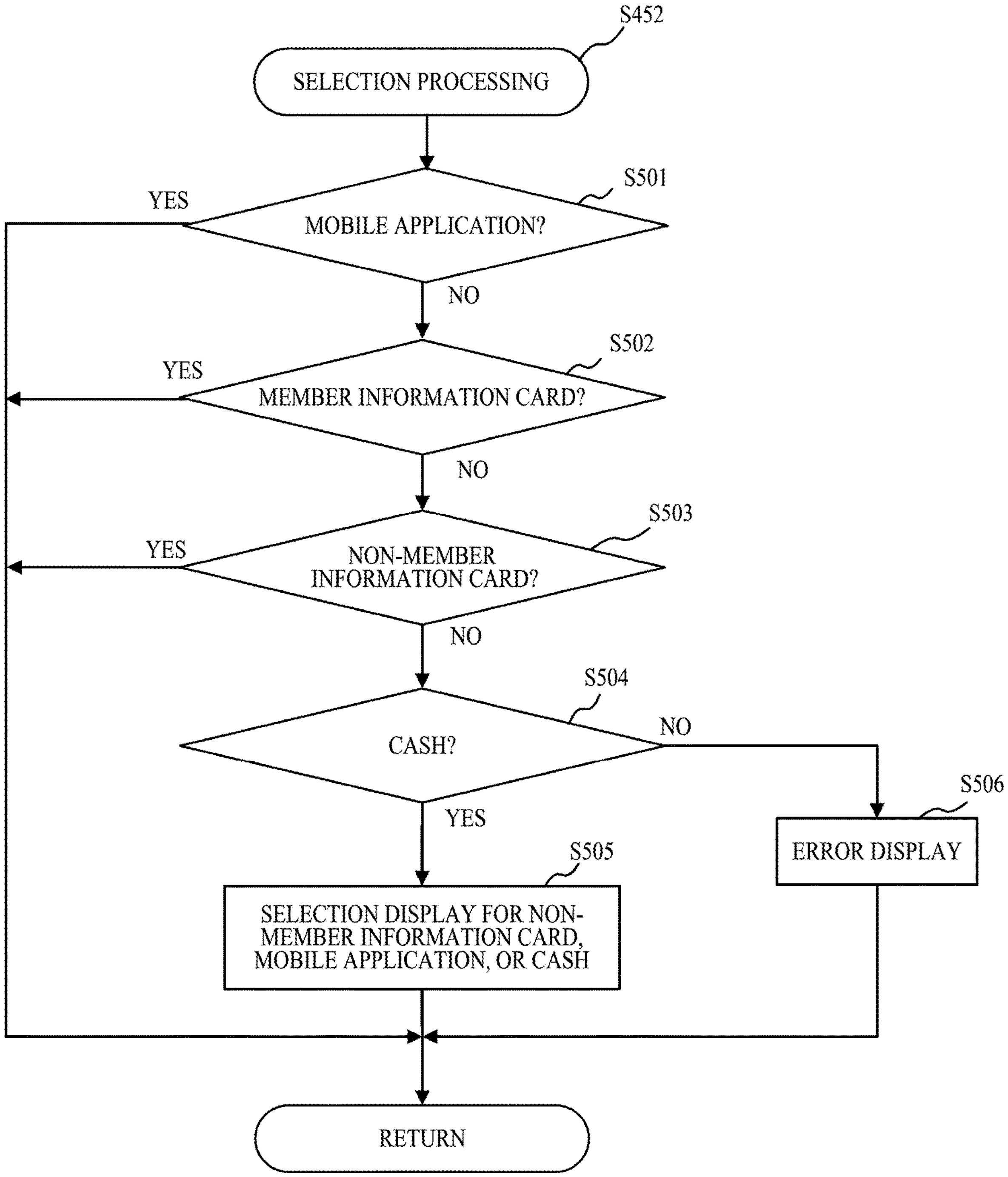
FIG. 10 is a flowchart illustrating selection processing at the PTS terminal.

FIG. 10 is a flowchart illustrating processes of the above selection processing (S452) in FIG. 9. When entering the selection processing, the PTS terminal 700 determines whether the selection result of the selection processing (S452) is the payout (transfer) to various accounts through the application program of the mobile device 1100 or not at Step S501 as illustrated in FIG. 10.

When the selection result is the payout (transfer) to various accounts through the application program of the mobile device 1100, the PTS terminal 700 obtains an affirmative result at Step S501 and makes the process proceed to Step S453 in FIG. 9. On the other hand, when the selection result is not the payout (transfer) to various accounts through the application program of the mobile device 1100, the PTS terminal 700 obtains a negative result at Step S501 and makes the process proceed from Step S501 to Step S502, determining whether the selection result is the payout (transfer) to the account for the member associated with the member information card or not.

When the selection result is the member information card, the PTS terminal 700 obtains an affirmative result at S502 and makes the process proceed to Step S453 in FIG. 9. On the other hand, when the selection result is not the member information card, the PTS terminal 700 obtains a negative result at Step S502 and makes the process proceed from Step S502 to Step S503, determining whether the selection result is the payout (transfer) to the account for the non-member associated with the non-member information card or not.

When the selection result is the non-member information card, the PTS terminal 700 obtains an affirmative result at S503 and makes the process proceed to Step S453 in FIG. 9. On the other hand, when the selection result is not the non-member information card, the PTS terminal 700 obtains a negative result at Step S503 and makes the process proceed to from Step S503 to Step S504, determining whether the selection result is the payout (transfer) by cash or not.

When the selection result is the payout by cash, the PTS terminal 700 obtains an affirmative result at S504 and makes the process proceed from Step S504 to Step S505, displaying a menu for the player selecting any of the payout by the non-member information card (opening of the account for the non-member), the payout through the application program of the mobile device 1100 (opening of the temporary account), and the payout by cash on the LCD 177 of the PTS terminal 700 and making the process proceed to Step S453 in FIG. 9.

As described above, according to the above processing in FIG. 9 and FIG. 10, it is possible to play the game by inputting the game medium to the slot machine 10 by using plural types of game media (cash, IC cards 1500 (the member information card, the non-member information card), the application program of the mobile device 1100), and it is also possible to select, as the method for paying out the dividend generated as the result of the game, any of the payout by cash, the transfer to the account for the member, the transfer to the account for the non-member, and the transfer to the temporary account using the application program of the mobile device 1100 in the information management system 100 including the PTS terminal 700.

[Payout Processing Using Mobile Application]

Figure 11:
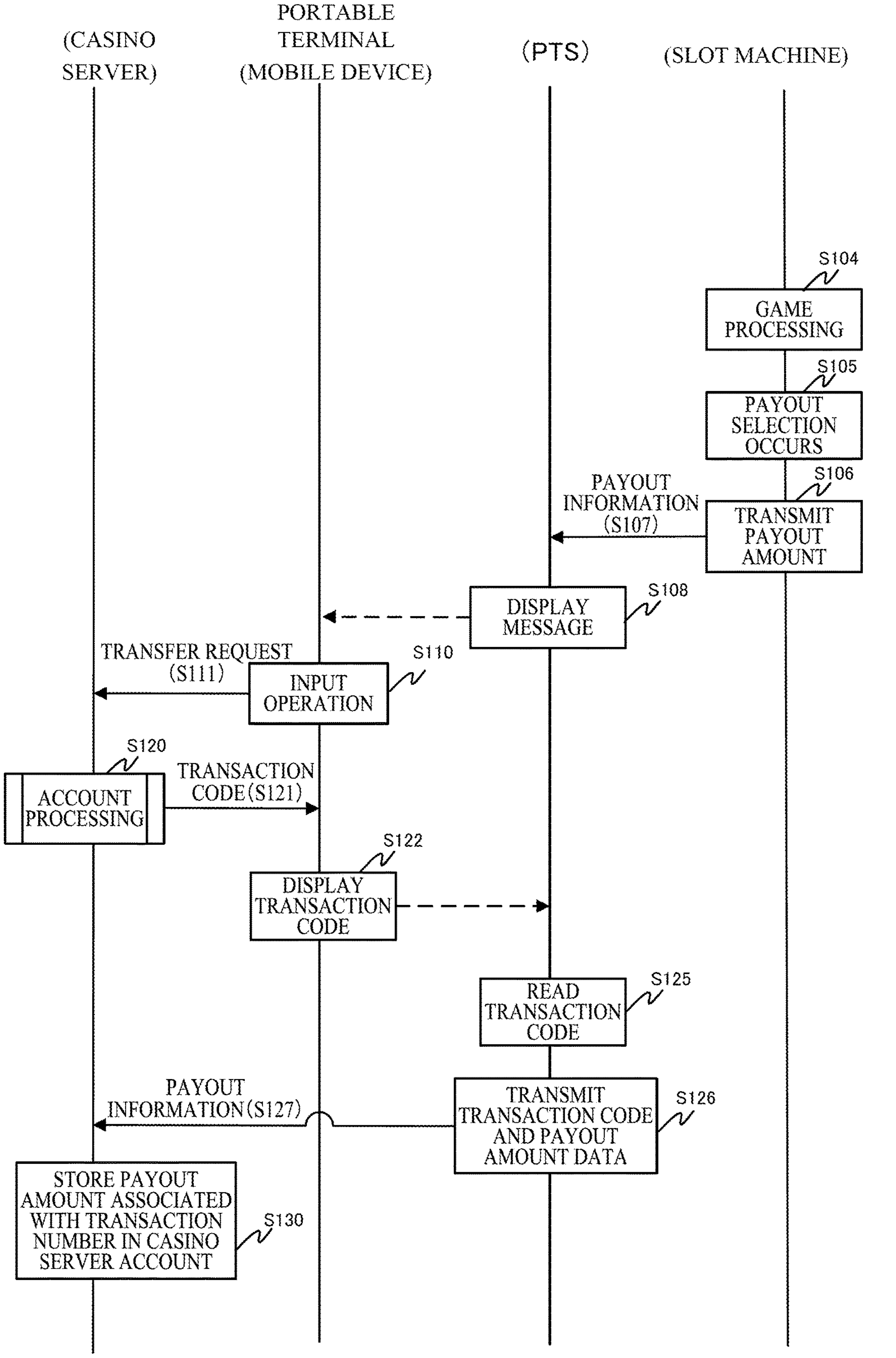
FIG. 11 is a flowchart illustrating payout processing through a mobile application.

FIG. 11 is a flowchart for explaining payout processing performed when the player receives payout of the game result by using the application program of the mobile device 1100.

As illustrated in FIG. 11, when game processing is performed in the slot machine 10 (S104) and the player operates the cashout button provided in the slot machine 10 after the game (S105), the game controller 70 of the slot machine 10 transmits information indicating a credit balance (information indicating the payout amount) stored in the storage unit of the slot machine 10 at this time to the PTS terminal 700 as payout information S107 (S106).

The PTS terminal 700 which has received the payout information S107 displays a message saying that "Please display a transaction code on the screen of the mobile device" on the LCD 177 of the PTS terminal 700 (S108). The transaction code is a code represented by, for example, the matrix two-dimensional code (QR code (registered trademark)) and the like and including information indicating the existing account or the account temporarily created on the casino server 400 and information indicating that processing with respect to the account is "payout (transfer)" (information specified by a transaction number (a unique symbol or number in the system)).

The player having seen the message (the player who has operated the cashout button) operates the mobile device 1100 carried by himself/herself there (S110), thereby inputting an instruction for displaying the transaction code to the mobile device 1100. The application program for creating the account on the casino server 400 is previously downloaded in the mobile device 1100, and the player can input the instruction for displaying the transaction code by starting the application program in the mobile device 1100. When the application program is set up in the mobile device 1100, registration processing of the mobile device 1100 is performed with respect to the casino server 400. In the registration processing, a portable terminal identifier of the portable terminal device 1100 is registered in the casino server 400. According to the registration, when the portable terminal device 1100 accesses the casino server 400 after the registration, it is possible to determine whether the mobile device 1100 is the registered one or not by comparing the registered portable terminal identifier with the portable terminal identifier of the mobile device 1100 which has accessed the server.

The mobile device 1100 having received the input operation (S110) performs authentication processing through a mobile communication network with respect to the casino server 400 to thereby allow the communication to be performed, creating a no named temporary account on the casino server 400 in this state and transmitting a transfer request S111 for requesting transfer of data indicating the payout amount to the temporary account from the PTS terminal 700 to the casino server 400 instead of paying out the payout amount by cash from the slot machine 10. The transfer request S111 is created at the mobile device 1100 and a portable terminal identifier unique to the mobile device 1100 is added. That is, the transfer request S111 includes information requesting the transaction code, and the casino server 400 having received the transfer request S111 executes account processing (S120) confirming whether the account opened so as to be associated with the portable terminal identifier already exists on the casino server 400 or not based on the information requesting the transaction code included in the transfer request S111 and the portable terminal identifier of the portable terminal device 1100 obtained in the authentication processing performed when the communication is started with the portable terminal device 1100 which is a transmission source of the transfer request S111.

Figure 12:
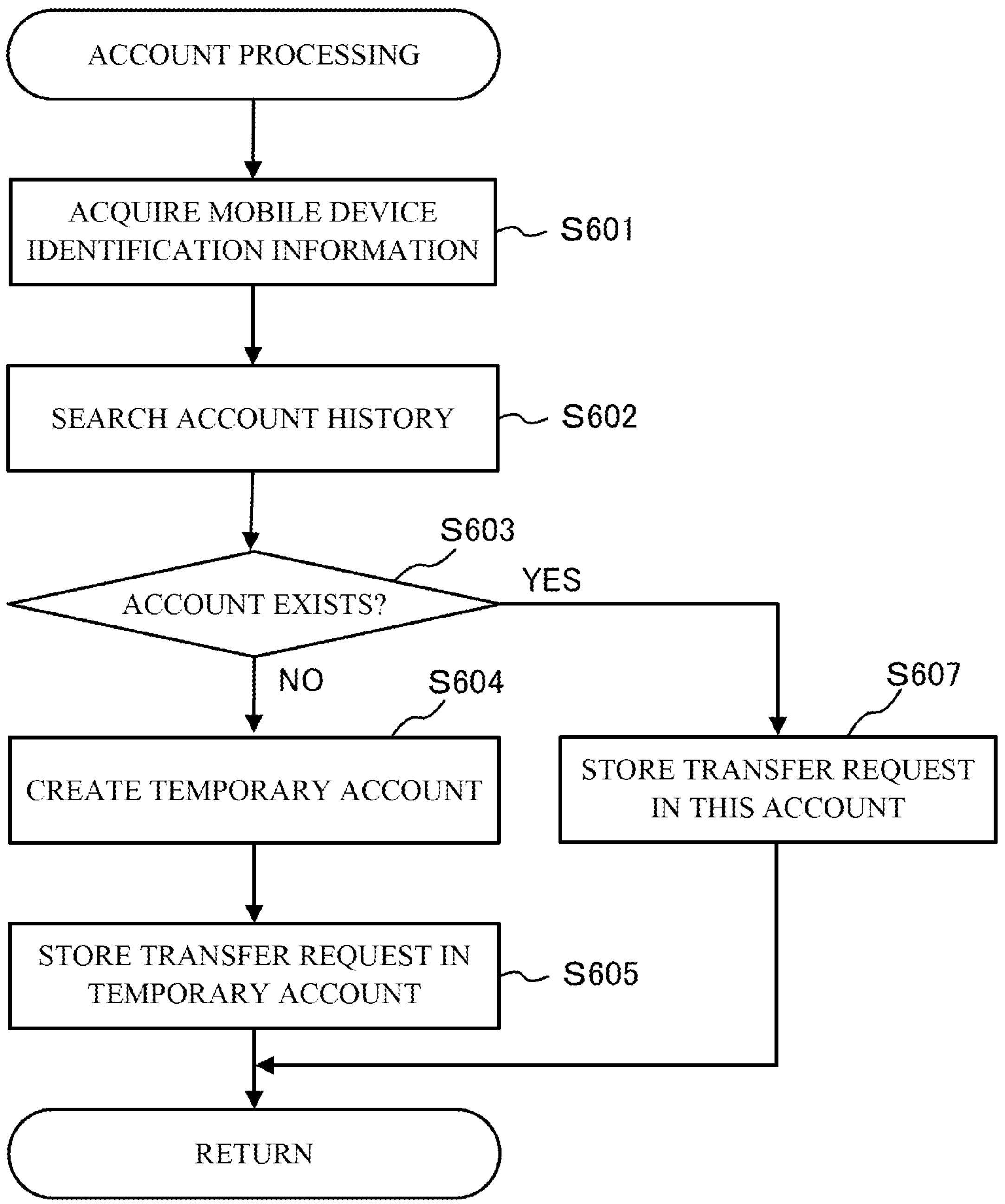
FIG. 12 is a flowchart illustrating account processing.

The account processing (S120) is illustrated in FIG. 12. In FIG. 12, the casino server 400 compares the portable terminal identifier registered in advance by registration processing of the portable terminal device 1100 and the portable terminal identifier of the portable terminal device 1100 as the transmission source of the transfer request S111 at this time, determining that the portable terminal device 1100 making the access at this time is the portable terminal device 1100 which has been normally registered when these identifiers are identical (S601).

Then, the casino server 400 searches stored information of the casino server 400 for whether the account corresponding to the portable terminal identifier has already been opened or not (S602). Then, whether there is a corresponding account or not is determined (S603). When there exists the corresponding account, the casino server 400 makes the process proceed to Step S607 in the determination. The casino server 400 stores the transfer request S111 in the account corresponding to the mobile device 1100 which has been opened at Step S607. On the other hand, when there does not exist the corresponding account, it is found that the temporary account of the portable terminal device 1100 which is the transmission source of the transfer request S111 has not been opened in the past. Then, the casino server 400 makes the process proceed from Step S603 to Step S604, opening the temporary account on the casino server 400.

At Step S605, the casino server 400 stores the transfer request S111 in the temporary account opened in the above Step S604.

According to the above processing, the casino server 400 creates the temporary account in the storage unit 460 of the casino server 400 and generates transaction information (FIG. 13) including account information for specifying the account and processing information indicating that the processing with respect to the account is transfer processing (payout processing from the slot machine to the account), storing the information in the storage unit 460 of the casino server 400. The casino server 400 also creates a transaction code S121 (matrix two-dimensional code) corresponding to the transaction information on the casino server 400 and stores the transaction code S121 in the storage unit 460 so as to be associated with the transaction information. Then, the casino server 400 transmits the transaction code S121 to the mobile device 1100 (S120) (FIG. 11).

Figure 14:
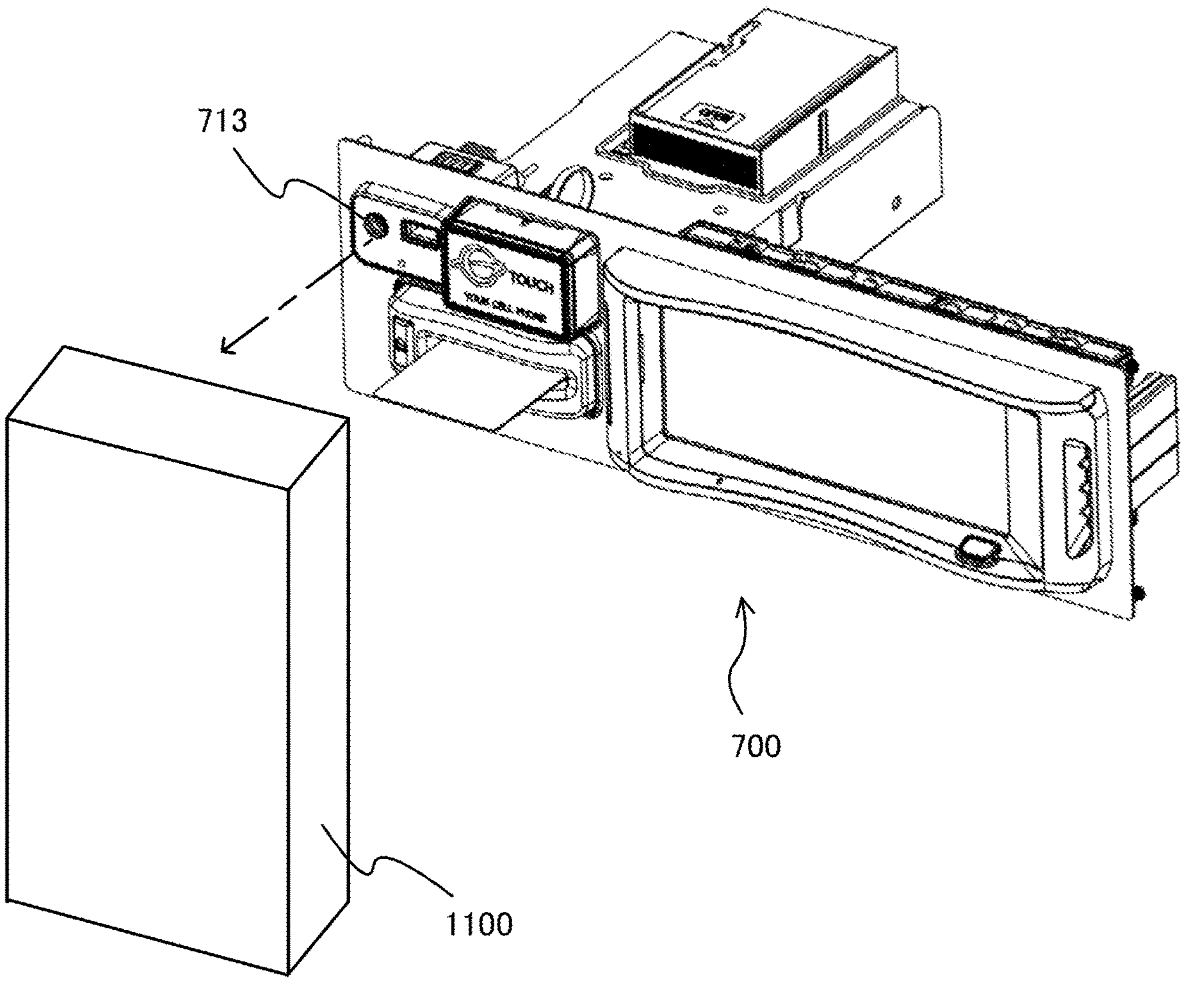
FIG. 14 is a perspective view illustrating a state where a display screen of a mobile device is imaged by a camera of the PTS terminal.

In FIG. 11, the mobile device 1100 having received the transaction code S121 stores the transaction code S121 in the storage unit of the mobile device 1100 and displays the transaction code S121 on the display screen of the mobile device 1100. As illustrated in FIG. 14, when the player makes the display screen of the mobile device 1100 face the camera 713 of the PTS terminal 700 in the state where the transaction code S121 is displayed on the display screen of the mobile device 1100 to allow the camera 713 to image the display screen on which the transaction code S121 is displayed, the PTS terminal 700 reads the transaction code S121 imaged through the camera 713 and performs communication with the casino server 400 to transmit payout information S127 including the transaction code S121 and payout amount data indicating the payout amount to the casino server 400 (S126) (FIG. 11).

The casino server 400 having received the payout information S127 transfers the payout amount to various accounts including the temporary account opened in the storage unit 460 of the casino server 400 so as to be associated with the transaction code S121 included in the payout information S127 and stores the payout amount there. That is, data indicating the payout amount is transferred and stored. The stored payout amount is associated with a transaction number for specifying each transaction ("payout", "deposit", "withdrawal" and the like). Accordingly, transaction information such as the account for specifying the temporary account (for example, "010202"), processing information indicating the processing content ("payout"), the portable terminal identifier (for example, "0101111"), money amount data relating to the processing (for example, a payout amount "2500 PHP" (Philippine peso)) concerning the "payout" is stored in the storage unit 460 of the casino server 400 so as to be associated with a transaction number (for example, "00001") as illustrated in FIG. 13. The transaction code (for example, the matrix two-dimensional code) corresponding to the transaction information in which the temporary account is opened on the casino server 400 is also associated with the transaction information (the transaction code is represented by a mark MK of a black square in FIG. 13).

The transaction information to which the transaction number "00001" is assigned is history information indicating that the dividend (for example, "2500 PHP") paid out from the gaming machine 10 as a result of the game has been transferred to the temporary account opened on the casino server 400 (the account is, for example, "010202"). The payout of the game result to the temporary account opened by the application program of the mobile device 1100 is not associated with the member information card or the non-member information card; therefore, the "information-card identification information" indicating identification information of the member information card or the non-member information card is not contained in the transaction information. The "member number" is not contained in the transaction information as the payout is not associated with the member information card. When the temporary account is created through the mobile device 1100, the transaction code used at the time of creation (for example, the matrix two-dimensional code) is also associated with the transaction number in the transaction information (the transaction code is represented by the mark MK of the black square in FIG. 13).

In the embodiment, when the temporary account is opened on the casino server 400 and data of cash (credit) to be paid out as a result of the game is stored in the temporary account, transaction information illustrated in FIG. 13 is additionally created. Furthermore, also in the case where the game is played by inserting the member information card or the non-member information card into the slot machine 10 (the PTS terminal 700), transaction processing about a payout and the like of the game performed by inserting the member information card or the non-member information card is also additionally created as transaction information.

Specifically, when the game is played by inserting the member information card or the non-member information card into the slot machine 10, the dividend to be paid out as a result of the game is transferred to the account for the member or the non-member opened on the casino server 400 so as to be associated with the member information card or the non-member information card used for the game as cash (credit) data, then, the member information card or the non-member information card is ejected from the slot machine 10. The casino server 400 is configured to store the transaction contents such as cash data pooled in the account associated with the member information card or the non-member information card and the money amount thereof, and history information such as information-card identification information of the member information card or the non-member information card in the storage unit 460 of the casino server 400 as transaction information not only in the case where game is played by inputting cash data to the slot machine 10 through the application program of the mobile device 1100 but also in the case where the game is played by using the member information card or the non-member information card. For example, in FIG. 13, a number "ME1111" is associated with transaction information to which a transaction number "00002" is assigned as the information-card identification information. This indicates that the member has played the game by inserting the member information card into the gaming machine 10. In this case, cash (credit) paid out to the player as a result of the game is transferred to the account for the member corresponding to the member information card used by the player at this time; therefore, the temporary account is not opened on the casino server 400, and the account for the member as a transfer destination (for example, "ME0143" as the "account") is included in the transaction information as the "account". In the transaction information to which the transaction number "00002" is assigned, a portable terminal identifier "0102222" is shown with brackets. This indicates that the portable terminal identifier can be also stored as transaction information when the portable terminal identifier of the mobile device 1100 is previously registered in the member information card at the time of registration.

As described above, in the payout processing using the mobile application illustrated in FIG. 11, the player creates the temporary account on the casino server 400 by the application program of the mobile device 1100 possessed by the player, issuing a transaction code associated with the temporary account on the casino server 400 and transmitting the code to the mobile device 1100. The transaction code imaged as the matrix two-dimensional code is displayed on the mobile device 1100, which is transferred to the PTS terminal 700 by near-field transfer by an imaging device.

Accordingly, the player not registering as the member or the player not carrying the member information card though registering as the member can store the money amount paid out by the game in the temporary account on the casino server 400. That is, the temporary account is created and the payout amount is stored there on the casino server 400 to thereby make cashless payment in the same manner as the member. Moreover, the temporary account is created on the casino server 400 by the mobile device 1100 possessed by the player to thereby obtain security effect similar to the case where the registered member information card is used by creating the temporary account through the mobile device 1100 of the player in which authentication setting is performed with the casino server 400.

A dividend generated when the player having the non-member information card though not registering as the member plays the game in the slot machine 10 is transferred to the account for the non-member opened on the casino server 400 so as to be associated with the non-member information card.

Accordingly, the non-member or the member not carrying the member information card can receive the same services as the member having the member information card when using the casino server 400.

[Payout Processing Using Information Card (Gaming by Member (Non-Member) Information Card)]

Figure 15:
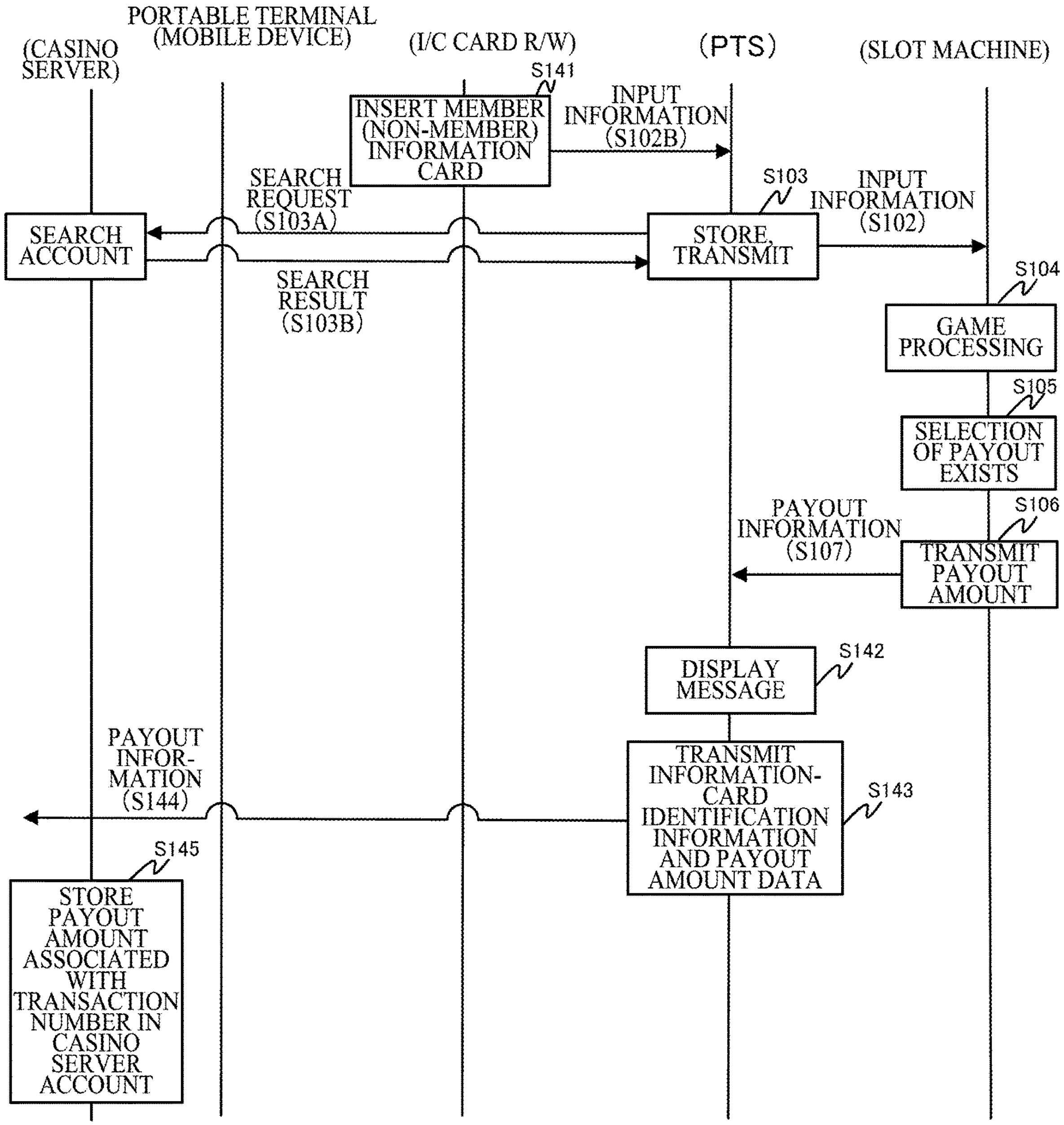
FIG. 15 is a flowchart illustrating payout processing through an information card.

FIG. 15 is a flowchart for explaining payout processing executed when the player having the member information card or the non-member information card receives a payout as a result of playing the game in the slot machine 10. In FIG. 15, the same symbols are added to the same processing as those in FIG. 11.

As illustrated in FIG. 15, when the player as the member (or the non-member) inserts the member information card (or non-member information card) into the IC card R/W 742 provided in the slot machine 10 (S141), input information S102B is transmitted from the bill entry 60 to the PTS terminal 700. The input information S102B includes information indicating that the member information card has been inserted and information-card identification information (card number) stored in the inserted member information card. The information management apparatus 500 stores information for identifying the member (member number, name, and the like) associated with the information-card identification information.

The PTS terminal 700 having received the input information S102B transmits search request S103A including the information-card identification information contained in the input information S102 to the casino server 400. The casino server 400 searches the account for the member (or for the non-member) associated with the information-card identification information contained in the search request 103A, reading the money amount data from the account and transmitting the data to the PTS terminal 700 as the search result S103B. The PTS terminal 700 stores the transmitted search result S103B in the RAM 753 of the PTS terminal 700 and transmits the result to the slot machine 10 as the input information S102.

The slot machine 10 having received the input information S102 from the PTS terminal 700 converts the money amount indicated by a kind and denominations of currency into credit data and stores the data in a storage unit (not illustrated) provided in the game controller 70 of the slot machine 10. The game controller 70 provides the stored credit data for BET of the game by an operation of the player to allow the game to proceed (S104). The credit data stored in the storage unit increases/decreases in accordance with the game result.

When the player operates the cashout button provided in the slot machine 10 after the game (S105), the game controller 70 transmits information indicating the credit balance (information indicating the payout amount) stored in the storage unit at this time to the PTS terminal 700 as the payout information S107 (S106).

The PTS terminal 700 having received the payout information S107 displays a message saying that "Prize money is transferred to a casino account" on the LCD 177 of the PTS terminal 700 (S142). The casino account indicates an account set inside the casino server managed by the casino where the slot machine 10 and the like are installed.

After the message display (S142), the PTS terminal 700 communicates with the casino server 400, thereby transmitting payout information S144 containing information-card identification information and payout amount data indicating the payout amount to the casino server 400 (S143).

The casino server 400 having received the payout information S144 stores the payout amount in the account associated with the information-card identification information contained in the payout information S144. The stored payout amount is associated with a transaction number for specifying the transaction relating to the payout. Accordingly, the account indicating an account number (member account) (for example, "ME0143"), processing information indicating the processing content (for example, "payout"), the member number (for example, "0000523"), and data such as money amount data (for example, the payout amount "4000 PHP") relating to the processing are stored in the storage unit 460 of the casino server 400 so as to be associated with transaction information containing the transaction number (for example, "00002") as illustrated in FIG. 13. The payout processing using the member information card by the member does not include processing of opening the temporary account on the casino server 400 through the application program of the mobile device 1100 and processing of storing the money amount data paid out to the temporary account; therefore, a transaction code (data of a two-dimensional barcode) required for transferring the money amount data using the application program is not generated in the casino server 400. Therefore, the transaction information does not include the transaction code.

[Withdrawal Processing by Automated Teller Machine (ATM) (without Member (Non-Member) Information Card)]

Figure 16:
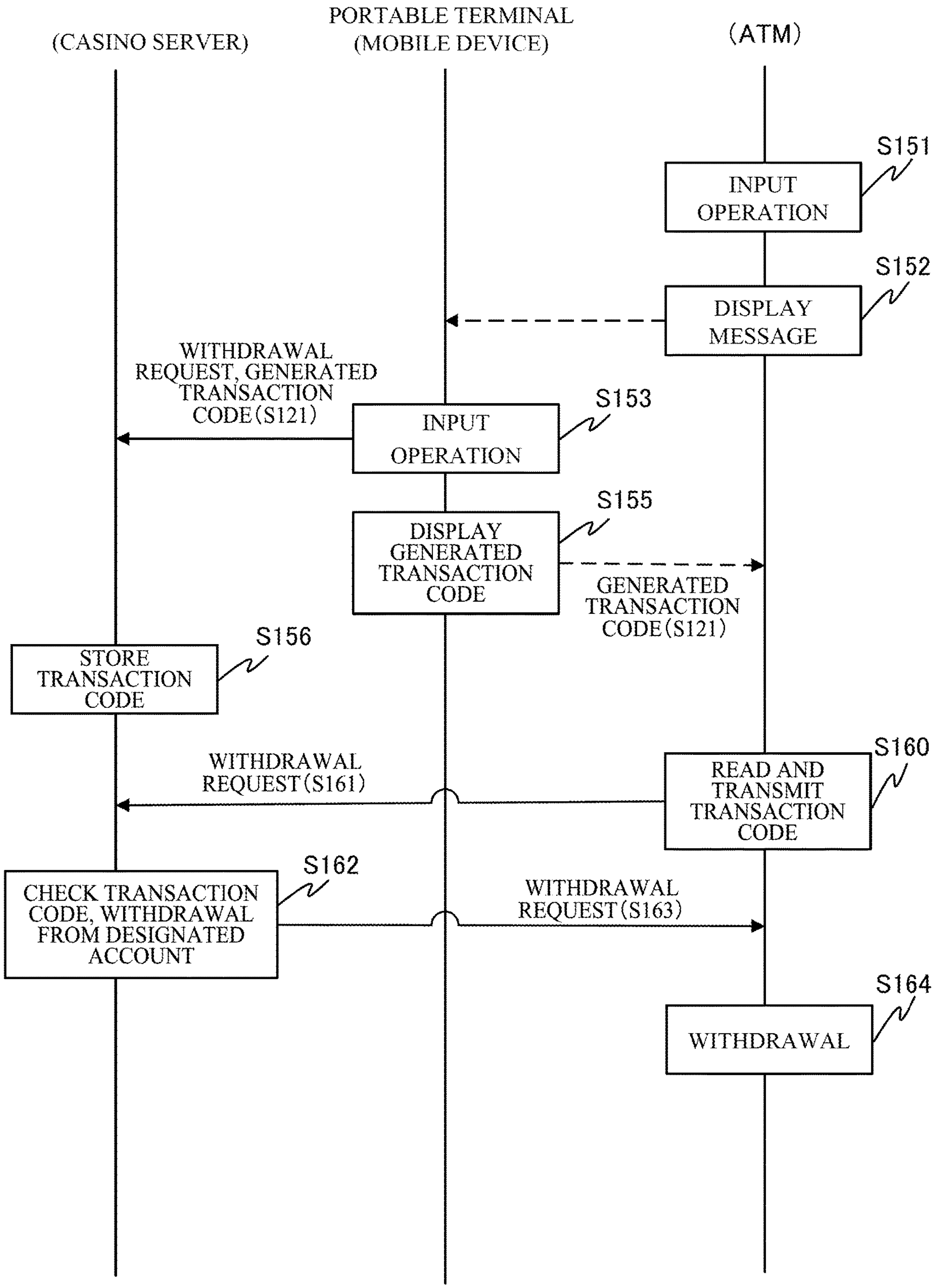
FIG. 16 is a flowchart illustrating withdrawal processing (without a member information card) by the automated teller machine (ATM)

FIG. 16 is a flowchart for explaining withdrawal processing in which cash stored in various accounts including the temporary account created on the casino server 400 is withdrawn through the automated teller machine (ATM) 300.

As illustrated in FIG. 16, when the player operates the operation unit 363 of the automated teller machine 300 (FIG. 4) (S151) to thereby input a withdrawal request and a use request of the transaction code (matrix two-dimensional code), a message saying that "Please display the transaction code on the screen of the mobile device" is displayed on the display screen (LCD 362) of the automated teller machine 300 (S152). Even when the member information card (IC card 1500) is not inserted into the card reader of the automated teller machine 300 for a predetermined period of time after the withdrawal request is inputted in the operation of the input operation S151, the automated teller machine 300 displays the message of "Please display the transaction code on the screen of the mobile device" on the display screen of the automated teller machine 300 (S152).

The player having seen the message operates the mobile device 1100 of himself/herself (S153) to thereby input an instruction for displaying the transaction code to the mobile device 1100. Receiving the input operation, the mobile device 1100 reads the transaction code S121 generated at S120 of FIG. 11 and stored in the storage unit of the mobile device 1100 and transmits the code to the casino server 400 with the withdrawal request (S153). The mobile device 1100 also displays the transaction code S121 on the display screen of the mobile device 1100 at this time (S155).

The casino server 400 having received the transaction code S121 stores the received transaction code S121 in the storage unit (S156).

On the other hand, when the player holds the display screen of the mobile device 1100 so as to face the camera 313 (FIG. 4) provided in the automated teller machine 300, the transaction code (matrix two-dimensional code) S121 displayed on the display screen of the mobile device 1100 is imaged by the camera 313 of the automated teller machine 300. The automated teller machine 300 reads the transaction code S121 imaged through the camera 313 and performs communication with the casino server 400, thereby transmitting a withdrawal request S161 including the transaction code S121 to the casino server 400 (S160). In a case where the withdrawal amount is designated by the input operation S151, the withdrawal amount is included in the withdrawal request S161.

The casino server 400 having received the withdrawal request S161 reads the designated money amount from the account associated with the transaction code S121 included in the withdrawal request S161, transmitting a withdrawal request S163 including the money amount data to the automated teller machine 300. The automated teller machine 300 having received the withdrawal request S163 dispenses cash with currency and the amount designated by the money amount data included in the withdrawal request S163.

In the case where the withdrawal amount is designated by the input operation (S151), the money amount data for the designated money amount is read from the account on the casino server 400 and dispensed from the automated teller machine 300.

As described above, even when the player does not insert the member information card into the automated teller machine 300 in the withdrawal processing illustrated in FIG. 16, the player transmits the transaction code stored in the mobile device 1100 (the transaction code issued when the account is created on the casino server 400 through the application of the mobile device 1100 possessed by the player) from the mobile device 1100 to the casino server 400 and transfers the transaction code imaged as the matrix two-dimensional code by near-field transfer from the mobile device 1100 to the automated teller machine 300. The automated teller machine 300 transmits the transaction code received as the image to the casino server 400. The casino server 400 compares the transaction code transmitted from the mobile device 1100 at this time with the transaction code transmitted from the automated teller machine 300 to thereby authenticate a right of access to the account and to transfer cash data in the account to the automated teller machine 300.

Accordingly, the player not registering as the member, the player not carrying the member information card though registering as the member, or the player not carrying the non-member information card with him/her though having the non-member information card is allowed to withdraw cash from the account. That is, a withdraw service can be received from the account on the casino server 400 in the same manner as a case where the player carries the member information card. As the withdraw processing is performed by using the mobile device 1100 authenticated with respect to the casino server 400, the security effect can be obtained in the same manner as the case where the registered member information card is used.

Accordingly, the non-member and the member not carrying the member information card can receive the same service as the member carrying the member information card when using the casino server 400.

In FIG. 13, transaction information to which a transaction number "00006" is assigned is information indicating that 500 PHP has been withdrawn from the temporary account "010202" by the application program of the mobile device 1100 represented by the portable terminal identifier "0101111" through the automated teller machine 300. In this case, the member (or the non-member) information card is not interposed; therefore, information-card identification information is not contained in the transaction information. Moreover, the mobile application is interposed; therefore, the transaction code (data of the two-dimensional barcode (represented by the mark MK of the black square in FIG. 13)) is contained in the transaction information.

[Withdrawal Processing by Automated Teller Machine (ATM) (with Member (Non-Member) Information Card)]

When the member player withdraws cash data stored in the account for the member created on the casino server 400 so as to be associated with information-card identification information of the member information card (IC card 1500) or the non-member player withdraws cash data stored in the account for the non-member created on the casino server 400 so as to be associated with information-card identification information of the non-member information card (IC card 1500) as cash through the automated teller machine (ATM) 300, the member (or non-member) player makes the card reader of the automated teller machine 300 read the member information card (or the non-member information card), thereby transmitting the information-card identification information of the member information card (or the non-member information card) from the automated teller machine 300 to the casino server 400. The casino server 400 allows the balance of the account for the member (or the non-member) to be withdrawn from the automated teller machine 300, which is associated with the information-card identification information received from the automated teller machine 300 at this time among the account which has been already created.

Figure 17:
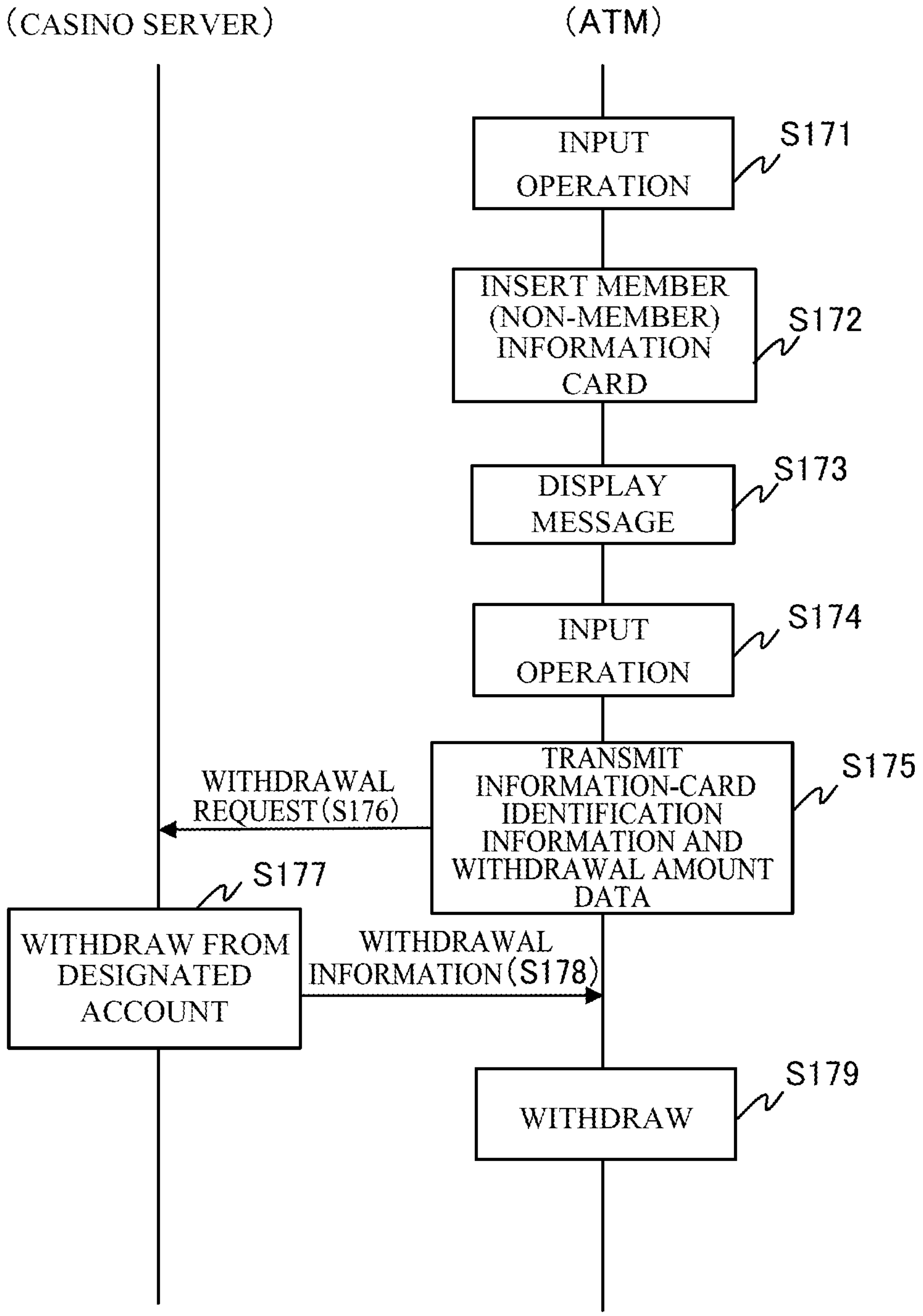
FIG. 17 is a flowchart illustrating withdrawal processing (with a member information card) by the automated teller machine (ATM)

Specifically, as illustrated in FIG. 17, when the member (or the non-member) player operates the operation unit 363 (FIG. 4) of the automated teller machine 300 (S171) to input the withdrawal request, and subsequently inserts the member (or the non-member) information card (IC card 1500) into the automated teller machine 300 (S172), the automated teller machine 300 displays a message saying that "Please input a withdrawal amount" on the display screen (LCD 362) thereof (S173). When the player receiving the display operates the operation unit 363 to input the withdrawal amount, the automated teller machine 300 transmits a withdrawal request S176 containing information-card identification information read from the inserted member information card (or the non-member information card) and withdrawal amount data indicating the withdrawal amount which has been operated and inputted to the casino server 400 (S175).

The casino server 400 specifies the account for the member (or the non-member) associated with the information-card identification information based on the information-card identification information contained in the withdrawal request S176 received from the automated teller machine 300, designating a money amount to be withdrawn based on the withdrawal amount data indicating the withdrawal amount contained in the withdrawal request S176, withdrawing the designated money amount from the account for the member (or the non-member), and transmitting the money amount data indicating the money amount relating to the withdrawal to the automated teller machine 300 as withdrawal information S178 (S177).

The automated teller machine 300 received the withdrawal information S178 dispenses the designated money amount from the deposit/withdrawal device 364 (FIG. 4) (S179).

Note that transaction information to which a transaction number "00003" is assigned in FIG. 13 is history information indicating that 1000 PHP has been withdrawn from the account "ME0143" for the member on the casino server 400 by using the member information card with the information-card identification information "ME1111" in the automated teller machine 300. In this case, the member number "0000523" is registered in the information processing apparatus 500 in advance so as to be associated with the information-card identification information; therefore, the casino server 400 can read the member number from the information processing apparatus 500 based on the information-card identification information and allows the number to be contained in the transaction information.

Transaction information to which a transaction number "00007" is assigned in FIG. 13 is history information indicating that 2000 PHP has been withdrawn from an account "010001" for the non-member on the casino server 400 by using the non-member information card with information-card identification information "GE0001" in the automated teller machine 300. In this case, the member number is not contained in the transaction information as the non-member information card is used without registration as a member. In the transaction information to which the transaction number "00007" is assigned, a portable terminal identifier "0133333" is illustrated with brackets. This indicates that the portable terminal identifier can be stored as transaction information when the portable terminal identifier of the mobile device 1100 is previously registered in the non-member information card in the case where the game is played by using the non-member information card.

[Credit-In Processing (without Member (Non-Member) Information Card)]

Figure 18:
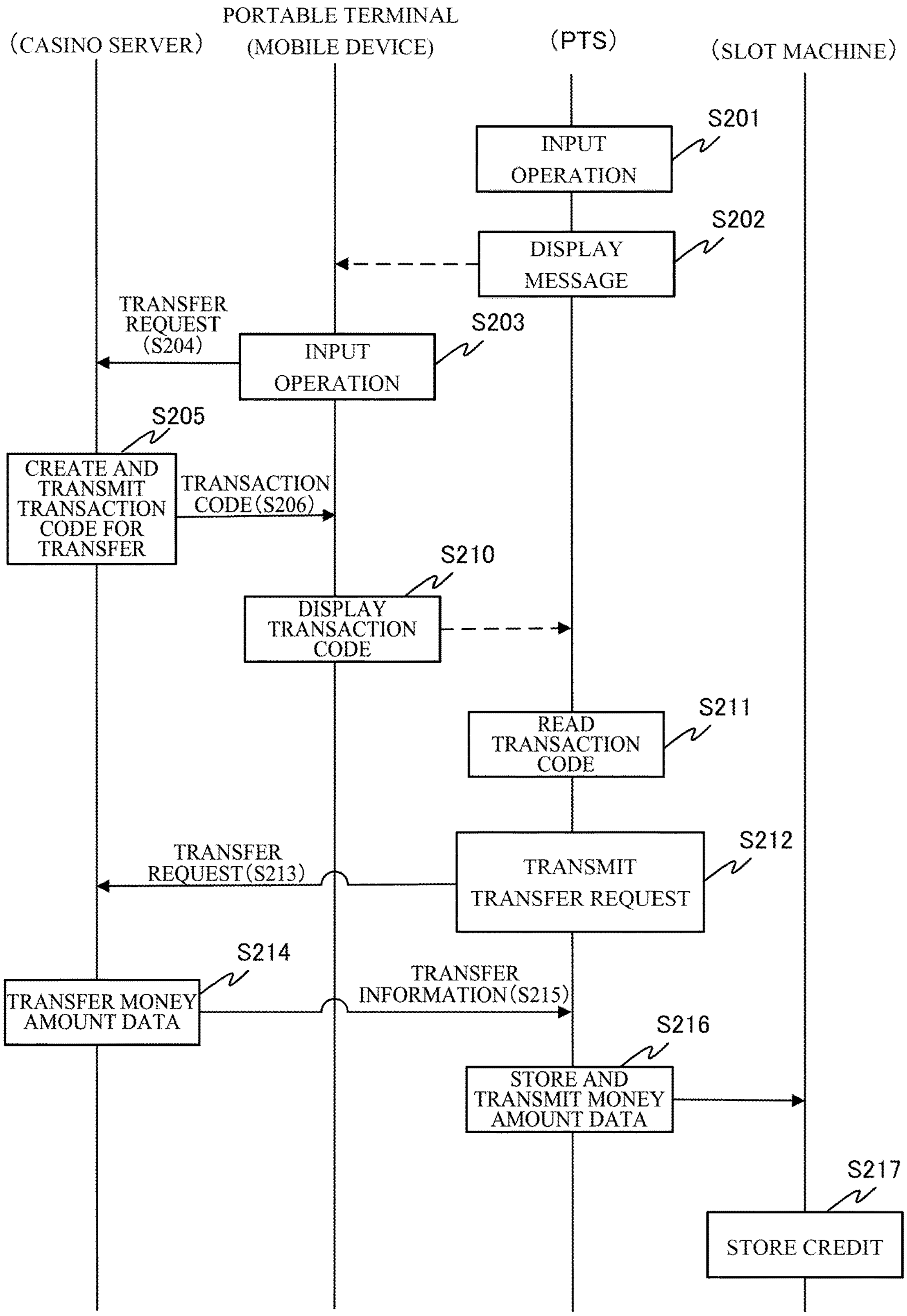
FIG. 18 is a flowchart illustrating credit-in processing (non-member)

FIG. 18 is a flowchart illustrating a processing procedure for the player carrying neither of the member information card and the non-member information card transferring (depositing) all or part of the money amount (credit) stored in the account already created on the casino server 400 by the mobile application to the slot machine 10 to be inputted as a credit for playing the game. The transferred contents of the money amount (credit) from the casino server 400 to the slot machine 10 can be set on the player's side or a system administrator's side. The transferred contents indicate the contents such as "full amount transfer", "prescribed certain amount transfer", and "to input transfer amounts every time". When the player sets the above transfer contents, for example, the money amount (credit amount) can be designated every time the player operates the PTS terminal 700 and makes the transfer request (a later-described input operation S201). On the other hand, when the system administrator sets the transfer contents, administrators of the casino server 400 and the slot machine 10 set the transfer contents in advance in the PTS terminal 700 and the casino server 400. In the later-described input operation S201 by the player, any of the above transfer contents previously set on the system is executed simply by designating the transfer.

In the accounts on the casino server 400, there exists, in addition to the temporary account and the account for the member created in the above-described payout processing in FIG. 11 and FIG. 14, an existing account for the member previously created by inputting (prepaying) money amount data from the player's account opened on the external financial server (FIG. 1) to the casino server 400. It is possible to transfer a given money amount (credit) to the slot machine 10 also from the existing account for the member by associating the information-card identification information of the member information card or the identifier of the mobile device 1100 with the existing account for the member.

As illustrated in FIG. 18, when the player operates the operation unit (LCD (touch panel) 177) of the PTS terminal 700 provided in the slot machine 10 and selects an item "Transfer a credit to the slot machine" and an item "Use a transaction code" from a displayed menu (S201), a message saying that "Please display the transaction code on the screen of the mobile device" is displayed on the LCD 177 of the PTS terminal 700 (S202). It is also possible to input and designate the money amount desired to be transferred by the player in the input operation S201. The transaction code indicates, for example, a code associated with information relating to the account of the player and information including a transaction number for cashless transaction (a unique symbol or a number in the system) which is represented by the matrix two-dimensional code (QR code (registered trademark)). Note that the PTS terminal 700 displays the message saying that "Please display the transaction code on the screen of the mobile device" on the LCD 177 also when the member (or non-member) information card (IC card 1500) is not inserted into the IC card R/W 742 for a certain period of time after the withdrawal request is inputted in the operation of the input operation S201.

When the player having seen the message operates the mobile device 1100 of himself/herself (S203) and selects a menu "Withdrawal from the account", the mobile device 1100 received the input operation transmits a request (transfer request S204) for transferring the money amount to the slot machine 10 from the account associated with the portable terminal identifier of the mobile device 1100 to the casino server 400. As the transfer request S204 includes the identifier of the mobile device 1100, the casino server 400 having received the transfer request S204 newly creates a transaction code (matrix two-dimensional code) S206 for specifying processing of designating the account in which payment is not completed (specifically, the account in which the system administrator has not paid the money amount in the account to the player) in the accounts associated with the identifier of the mobile device 1100 and the money amount in the account (any of full amount, part of the amount, a fixed amount previously set in the account), and processing of transferring the designated money amount to the slot machine 10, stores the transaction code in the storage unit of the casino server 400 and transmits the transaction code to the mobile device 1100 (S205).

The mobile device 1100 having received the transaction code S206 stores the received transaction code S206 in the storage unit of the mobile device 1100 and displays the transaction code on the display screen of the mobile device 1100. When the player makes the display screen of the mobile device 1100 face the camera 713 of the PTS terminal 700 in the state where the transaction code S206 is displayed on the display screen of the mobile device 1100 and allows the transaction code S206 to be imaged by the camera 713, the PTS terminal 700 reads the transaction code S206 imaged through the camera 713 (S211) and transmits a transfer request S213 including the transaction code S206 to the casino server 400 (S212).

The casino server 400 having received the transfer request S213 reads the money amount designated by the transaction code S206 from the account associated with the transaction code S206 included in the transfer request S213, and transmits the money amount to the PTS terminal 700 as transfer information S215 (S214).

The PTS terminal 700 having received the transfer information S215 stores the money amount transferred from the casino server 400 in the RAM 753 of the PTS terminal 700 and transmits the data to the slot machine 10 (S216).

The slot machine 10 having received the money amount data (data indicating the money amount) from the PTS terminal 700 converts the money amount data into credit data for playing the game and stores the data (S217). Accordingly, the money amount data stored in the account associated with the mobile device 1100 of the player on the casino server 400 is transferred to the slot machine 10 to be used for the game.

As described above, in the transfer processing illustrated in FIG. 18, even when the player does not insert the member (or non-member) information card into the slot machine 10, the player communicates with the casino server 400 through the mobile device 1100, and the casino server 400 allows transfer processing of cash (cash data) stored in the account associated with the identifier of the mobile device 1100 to correspond to the newly issued transaction code and transmits the transaction code to the mobile device 1100. Then, the mobile device 1100 having received the newly issued transaction code transfers the transaction code to the PTS terminal 700 by the near-field transfer as the transaction code imaged as the matrix two-dimensional code. The PTS terminal 700 transmits the transaction code received as the image to the casino server 400, and the casino server 400 compares the transaction code transmitted from the PTS terminal 700 at this time with the newly-issued transaction code which has been transmitted to the mobile device 1100, thereby performing authentication with respect to the transfer request for requesting transfer from the account and transferring the cash (cash data) in the account to the PTS terminal 700.

Accordingly, the player not registering as the member, the player not carrying the member information card though registering as the member, or the player not carrying the non-member information card with him/her though having the non-member information card can allow cash (cash data) to be transferred to the PTS terminal 700 from the account on the casino server 400 and to be used for the game. That is, the transfer service from the account on the casino server 400 can be received in the same manner as in a case where the player carries the member (or non-member) information card. As the transfer processing is performed by using the mobile device 1100 authenticated with respect to the casino server 400, the security effect can be obtained in the same manner as the case where the registered member information card is used.

Accordingly, the non-member or the member not carrying the member information card can receive the same services as in the case where the player has the member information card when using the casino server 400.

In FIG. 13, transaction information to which a transaction number "00005" is assigned is history information indicating that 2500 PHP has been deposited in the slot machine 10 from the temporary account "010202" by the application program of the mobile device 1100 represented by the portable terminal identifier "0101111". In this case, the member (or the non-member) information card is not interposed; therefore, information-card identification information is not contained in the transaction information. Moreover, the transaction code (data of the two-dimensional barcode (represented by the mark MK of the black square in FIG. 13)) is contained in the transaction information.

[Credit-In Processing (with Member (Non-Member) Information Card)]

Figure 19:
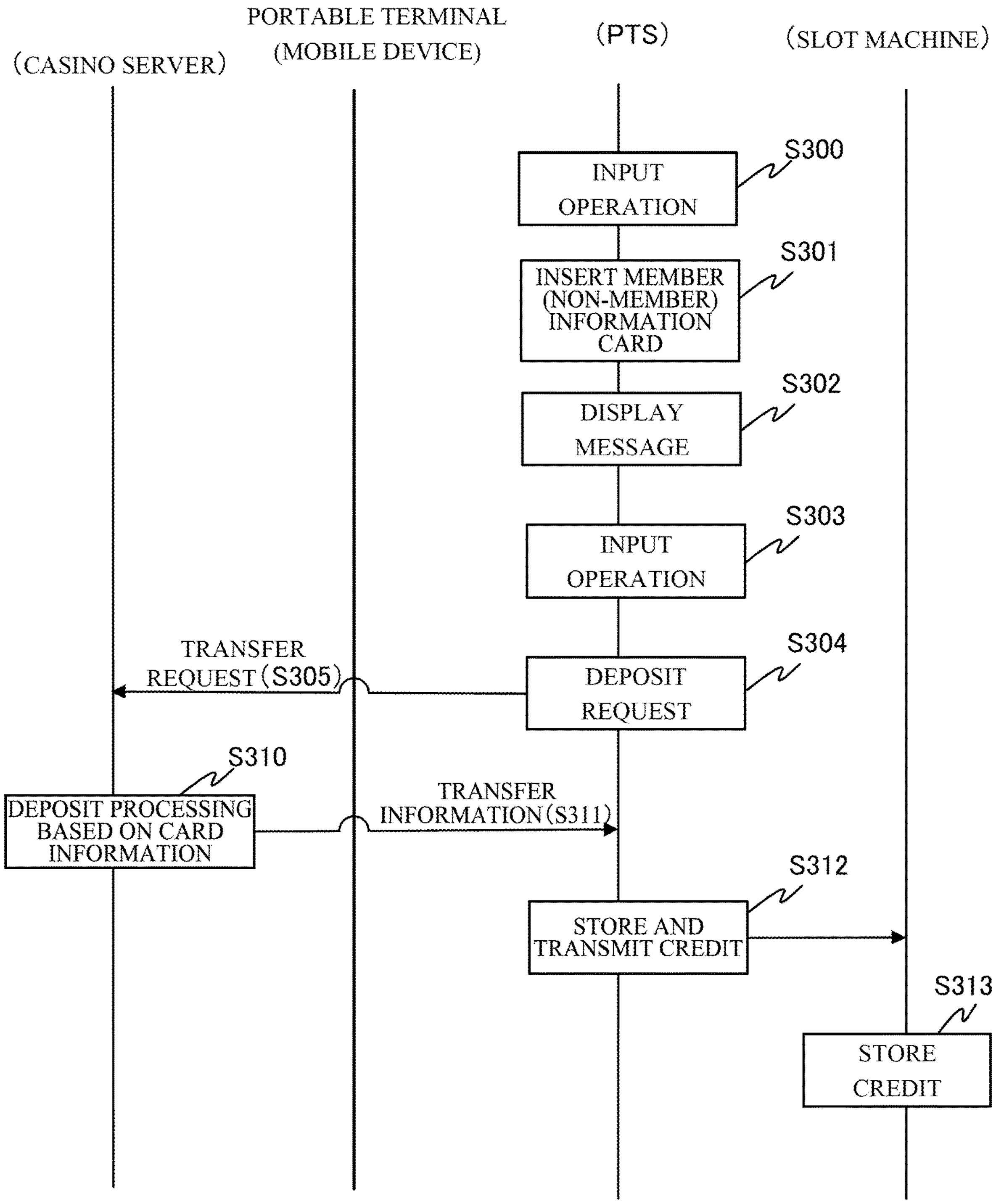
FIG. 19 is a flowchart illustrating credit-in processing (member).

FIG. 19 is a flowchart illustrating a processing procedure for the member player transferring all or part of the money amount stored in the account for the member already created on the casino server 400 or for the non-member player transferring all or part of the money amount stored in the account for the non-member already created on the casino server 400 to the slot machine 10 to be inputted (credited) as a credit for playing the game.

In the case where the member (or the non-member) player transfers (credit-in) cash data stored in the account for the member (or the non-member) created on the casino server 400 so as to be associated with information-card identification information of the member (or the non-member) information card (IC card 1500) to the slot machine 10, the member (or the non-member) player makes the member (or the non-member) information card read by the IC card R/W 742 of the PTS terminal 700, and the information-card identification information of the member (the non-member) information card is transmitted from the PTS terminal 700 to the casino server 400. The casino server 400 can transfer a balance of the account for the member (or the non-member) associated with the information-card identification information received from the PTS terminal 700 among the already-created accounts to the slot machine 10 through the PTS terminal 700.

Specifically, as illustrated in FIG. 19, when the member (or the non-member) player operates the operation unit (the touch panel of the LCD 177) of the PTS terminal 700 (S300) to thereby input a transfer request, then, inserts the member (or the non-member) information card (IC card 1500) into the IC card R/W 742 of the PTS terminal 700 (S301), the PTS terminal 700 displays a message saying that "Please input the transfer money amount" on the display screen (LCD 177) thereof (S302). When the player having received the display operates the operation unit (the touch panel of the LCD 177) to thereby input the transfer money amount, the PTS terminal 700 transfers a transfer request S305 including information-card identification information read from the inserted member (or the non-member) information card and transfer amount data indicating the inputted transfer money amount to the casino server 400 (S304). In the case where the system administrator designates the transfer money amount in advance, the designated money amount is transferred. In this case, a message indicating that the transfer money amount is determined in advance is displayed.

The casino server 400 specifies the account for the member (or the non-member) associated with the information-card identification information based on the information-card identification information contained in the transfer request S305 received from the PTS terminal 700, designating the money amount to be transferred based on transfer money amount data indicating a transfer amount contained in the transfer request S305, withdrawing the designated money amount from the member (or the non-member) account, and transmitting the money amount data indicating the money amount relating to the transfer to the PTS terminal 700 as transfer information S311 (S310).

The PTS terminal 700 having received the transfer information S311 stores the money amount transferred from the casino server 400 in the RAM 753 of the PTS terminal 700 and transmits the money amount to the slot machine 10 (S312).

The slot machine 10A (10B, 10C, . . . ) having received the money amount data from the PTS terminal 700 converts the money amount data into credit data for playing the game and stores the data (S313). Accordingly, the money amount data stored in the account associated with the member information card (information-card identification information or the member number) or the non-member information card (information-card identification information) of the player on the casino server 400 is transferred to the slot machine 10 to be used for the game.

Note that transaction information to which a transaction number "00004" is assigned in FIG. 13 is history information indicating that 2500 PHP has been deposited in the slot machine 10 from the account "010001" for the non-member on the casino server 400 by using the non-member information card with the information-card identification information "GE0001" in the slot machine 10 (the PTS terminal 700). In this case, the non-member information card is used without registering as the member; therefore, the transaction information does not contain the member number. The portable terminal identifier "0133333" is contained in the transaction information when the portable terminal is registered at the time of issuing the non-member information card; therefore, the portable terminal identifier is illustrated with brackets in FIG. 13.

Moreover, transaction information to which a transaction number "00008" is assigned in FIG. 13 is history information indicating that 1500 PHP has been deposited in the slot machine 10 from the account "ME0143" for the member on the casino server 400 by using the member information card with the information-card identification information "ME1111" in the slot machine 10 (the PTS terminal 700). In this case, the member number "0000523" is previously registered in the information processing apparatus 500 so as to be associated with the information-card identification information; therefore, the casino server 400 can read the member number from the information processing apparatus 500 based on the information-card identification information to be contained in the transaction information.

Operation and Effect of Embodiment

In the information management system 100 described above, the temporary account is opened on the casino server 400 by the application program of the mobile device 1100 to thereby deposit/withdraw cash data; therefore, the player not having the member information card or the non-member information card can play the game and receive the payout of a dividend as a result of the game as if the player has the member information card or the non-member information card.

When accessing the temporary account on the casino server 400 through the application program of the mobile device 1100, the transaction code is transmitted through near-field transmission of transaction code realized by imaging image of transaction code with respect to the device for accessing the account on the casino server 400 such as the slot machine 10 (the PTS terminal 700) and the automated teller machine 300, which allows only the player playing the game in the slot machine 10 or the player withdrawing cash at the automated teller machine 300 to access the temporary account through the transaction code at an actual spot. Accordingly, it is possible to suppress, for example, a behavior of illegally accessing the temporary account by a remote operation.

Other Embodiments

The case where the transaction code (matrix two-dimensional code) is displayed on the display screen of the mobile device 1100 and imaged by the PTS terminal 700 or the automated teller machine 300 has been described in the above embodiment (FIG. 11, FIG. 16, and FIG. 18); however, information such as the transaction code may be transmitted from the mobile device 1100 to the PTS terminal 700 or the automated teller machine 300 by using a near-field wireless communication technique which is so-called "NFC: Near Field Communication" (for example, a communication method using a near-field wireless communication standard for digital devices such as "Bluetooth (registered trademark)"). In this case, a near-field wireless communication unit is provided in the mobile device 1100, the PTS terminal 700, and the automated teller machine 300. As near-field communication is performed with a transmission target (the PTS terminal 700 or the automated teller machine 300) in the near-field wireless communication technique, the player allows the PTS terminal 700 or the automated teller machine 300 to read information such as the transaction code directly. Therefore, the system can be used in the same manner as in the case where the matrix two-dimensional code is displayed on the display screen of the mobile device 1100 and imaged by the camera of the PTS terminal 700 or the automated teller machine 300. Moreover, efforts such as holding the screen and adjustment of an angle toward the camera at the time of imaging the matrix two-dimensional code or the like on the display screen by the camera are not required in the case where the transaction code is transferred by using the near-field wireless communication technique. Therefore, the player can transfer information such as a transaction code to the PTS terminal 700 or the automated teller machine 300 in front of him/her more conveniently.

The case where bills are used as the game medium (paper sheets) has been described in the above embodiment; however, the game medium is not limited to this. For example, coins, medals, tokens, tickets with barcodes and so on are adopted in addition to electronic valuable information such as electronic money. The currency unit is not limited to "Philippine peso" and "U.S. dollar" but various currency units can be adopted.

The case where credit data paid out from the slot machine 10 is stored in the account on the casino server 400 and the stored credit data is withdrawn from the automated teller machine 300 or transferred to the slot machine 10 to be used for a new game has been described in the above embodiment; however, the present invention is not limited to this and can be widely applied to cases where credit data is transferred to other gaming machines (EGM) and other devices such as vending machines of beverages to play new games or purchase goods due to the credit data.

The case where member information associated with information-card identification information is used as information for identifying the member has been described in the above embodiment; however, the information is not limited to this. For example, it is also preferable that a human body detection camera is provided in the PTS terminal 700 and the player is imaged by the human body detection camera to thereby detect the player registered in advance by face recognition based on a taken face image of the player.

The case where the temporary account for the non-member is created on the casino server 300 has been described in the above embodiment. It is also preferable that, in addition to the above case, a non-member registers as the member to associate registration information with the created temporary account to thereby use the temporary account created for the non-member as the account for the member successively.

The case where the transaction code displayed in the mobile device 100 is read in the PTS terminal 700 has been described in the above embodiment; however, the reading is not limited to this. it is also preferable that the transaction code is displayed on the PTS terminal 700 and is read by the mobile device 1100.

The case where it is possible to select that the game dividend obtained when the game has been played by inserting cash into the slot machine 10 (the PTS terminal 700) is paid out by newly issuing the non-member information card has been described in the above embodiment. It is also possible to suppress the number of non-member information cards to be issued by prohibiting the selection.

REFERENCE SIGNS LIST

10: slot machine
30: control panel
60: bill entry
70: game controller
141: lower image display panel
170: display controller
300: automated teller machine
400: casino server
500: information processing apparatus
700: PTS terminal
1100: mobile device

The invention claimed is:

1. An information management system comprising:

a terminal device connected so as to communicate with a gaming machine capable of playing a game according to inputted currency;

a casino server capable of communicating with the terminal device by a prescribed communication method; and a mobile device capable of communicating with the casino server;

wherein the casino server includes a temporary account processing device creating a temporary account for storing money amount data and transmitting transaction information for specifying the created temporary account to the mobile device in response to a request from the mobile device, the mobile device includes a first near-field transfer device transferring the transaction information transmitted from the casino server to the terminal device by near-field transfer, and the terminal device includes a second near-field transfer device acquiring the transaction information transferred from the first near-field transfer device of the mobile device by the near-field transfer and a temporary account processing device executing processing with respect to the temporary account on the casino server specified by the transaction information acquired by the second near-field transfer device through the communication method, wherein the temporary account processing device, in response to the request from the mobile device, transmits second transaction information for specifying processing of transferring a money amount of the temporary account to the mobile device, wherein the first short-distance transfer device of the mobile device transfers the second transaction information transmitted from the casino server to the terminal device by the near-field transfer, and wherein the second near-field transfer device of the terminal device acquires the second transaction information transferred from the first near-field transfer device of the mobile device by the near-field transfer, and the terminal device transmits the money amount of the temporary account in the casino server to the gaming machine through the communication method thereby providing the money amount to the game of the gaming machine.

2. The information management system according to claim 1, wherein the first near-field transfer device includes a display device displaying a prescribed transfer image based on the transaction information on a display part of the mobile device, and the second near-field transfer device includes an imaging device taking the transfer image displayed on the display device of the mobile device.

3. The information management system according to claim 1, wherein the temporary account processing device stores money amount data paid out from the gaming machine in the casino server so as to be associated with the temporary account as processing with respect to the temporary account.

4. The information management system according to claim 1, wherein the temporary account processing device transfers the money amount data stored in the casino server so as to be associated with the temporary account to the terminal device as processing with respect to the temporary account.

5. The information management system according to claim 1, wherein the casino server includes a transfer device transferring the money amount data stored so as to be associated with the transaction information to an automated teller machine based on the transaction information transmitted from the automated teller machine.

6. A terminal device connected so as to communicate between a gaming machine capable of playing a game according to inputted currency and a casino server storing money amount data paid out from the gaming machine, comprising:

a near-field transfer device acquiring prescribed transaction information from a mobile device by near-field transfer; and a transmission device transmitting money amount data paid out from the gaming machine to the casino server so as to be associated with the transaction information based on the transaction information transferred by the near-field transfer, wherein the near-field transfer device acquires second transaction information, for specifying processing of transferring a money amount of a temporary account to the mobile device, transferred from the mobile device by the near-field transfer, wherein the transmission device transmits the money amount of the temporary account in the casino server to the gaming machine through a communication method thereby providing the money amount to the game of the gaming machine.

7. An information management system comprising:

a terminal device connected so as to communicate with a gaming machine capable of playing a game according to inputted currency;

a casino server capable of communicating with the terminal device by a prescribed communication method;

a mobile device capable of communicating with the casino server; and a non-member card issuing device configured to issue a non-member card associated with a result of the game according to end of the game, wherein the casino server includes a temporary account processing device creating a temporary account for storing money amount data and transmitting transaction information for specifying the created temporary account to the mobile device in response to a request from the mobile device, wherein the mobile device includes a first near-field transfer device transferring the transaction information transmitted from the casino server to the terminal device by near-field transfer, wherein the terminal device includes a second near-field transfer device acquiring the transaction information transferred from the first near-field transfer device of the mobile device by the near-field transfer and a temporary account processing device executing processing with respect to the temporary account on the casino server specified by the transaction information acquired by the second near-field transfer device through the communication method, and wherein the terminal device causes a player to select a payout method for the result of the game from among a plurality of payout methods including a first payout method that payouts the result of the game by issuing the non-member card and a second payout method that payouts the result of the game to the temporary account associated with the mobile device.

8. The information management system according to claim 7, wherein the temporary account processing device, in response to the request from the mobile device, transmits second transaction information for specifying processing of transferring a money amount of the temporary account to the mobile device, wherein the first short-distance transfer device of the mobile device transfers the second transaction information transmitted from the casino server to the terminal device by the near-field transfer, and wherein the second near-field transfer device of the terminal device acquires the second transaction information transferred from the first near-field transfer device of the mobile device by the near-field transfer, and the terminal device transmits the money amount, which is specified by the second transaction information, of the temporary account in the casino server to the gaming machine through the communication method thereby providing the money amount to the game of the gaming machine.

9. A terminal device connected so as to communicate among a gaming machine capable of playing a game according to inputted currency, a non-member card issuing device configured to issue a non-member card associated with a result of the game according to end of the game, and a casino server storing money amount data paid out from the gaming machine, the terminal device comprising:

a controller causing a player to select a payout method for the result of the game from among a plurality of payout methods including a first payout method that payouts the result of the game by issuing the non-member card and a second payout method that payouts the result of the game to a temporary account associated with a mobile device;

a near-field transfer device acquiring prescribed transaction information from the mobile device by near-field transfer; and a transmission device transmitting money amount data paid out from the gaming machine to the casino server so as to be associated with the transaction information based on the transaction information transferred by the near-field transfer.

* * * * *